(12) United States Patent
Hahn et al.

(10) Patent No.: US 9,015,209 B2
(45) Date of Patent: *Apr. 21, 2015

(54) DOWNLOAD MANAGEMENT OF DISCARDABLE FILES

(75) Inventors: Judah Gamliel Hahn, Ofra (IL); David Koren, Ra'anana (IL)

(73) Assignee: SanDisk IL Ltd., Kfar Saba (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/720,006

(22) Filed: Mar. 9, 2010

(65) Prior Publication Data

US 2010/0228795 A1    Sep. 9, 2010

Related U.S. Application Data

(63) Continuation-in-part of application No. 12/645,194, filed on Dec. 22, 2009, which is a continuation of application No. PCT/US2009/065056, filed on Nov. 19, 2009, and a continuation-in-part of application No.
(Continued)

(30) Foreign Application Priority Data

Sep. 25, 2009    (IN) .................. 2238/MUM/2009

(51) Int. Cl.
    G06F 17/30    (2006.01)
(52) U.S. Cl.
    CPC .............................. *G06F 17/30147* (2013.01)
(58) Field of Classification Search
    USPC ................................................ 707/821, 827
    See application file for complete search history.

(56) References Cited

U.S. PATENT DOCUMENTS

| 5,491,810 A | 2/1996 | Allen |
| 5,754,939 A | 5/1998 | Herz et al. |

(Continued)

FOREIGN PATENT DOCUMENTS

| CN | 101375579 | 9/2009 |
| EP | 0866590 | 8/1998 |

(Continued)

OTHER PUBLICATIONS

Rekkedal, S., "Caching of Interactive Branching Video in MPEG-4—Thesis for the Candidatus Scientiarum Degree", *University of Oslo Department of Informatics*, Jul. 12, 2004, 140 pages.

(Continued)

*Primary Examiner* — Khanh Pham
(74) *Attorney, Agent, or Firm* — Brinks Gilson & Lione

(57) ABSTRACT

A request is received to store a file in a storage area of a storage device, the file being discardable and having associated therewith data in a data structure associated with the storage device. The file is marked as a discardable file. In some implementations a file system structure of the data structure is marked to indicate that the file is a discardable file, where in other implementations, the file itself is marked to indicate that the file is a discardable file. A download manager determines a download condition associated with the request to store the discardable file in the storage area of the storage device and determines whether to delay a download to the storage device of the discardable file based on the determined download condition. The download manager manages the download of the discardable file to the storage device based on the determination of whether to delay the download of the discardable file to the storage device.

30 Claims, 19 Drawing Sheets

Related U.S. Application Data

12/336,089, filed on Dec. 16, 2008.

(60) Provisional application No. 61/159,034, filed on Mar. 10, 2009, provisional application No. 61/259,418, filed on Nov. 9, 2009, provisional application No. 61/159,034, filed on Mar. 10, 2009.

(56) References Cited

U.S. PATENT DOCUMENTS

| | | |
|---|---|---|
| 5,790,886 A | 8/1998 | Allen |
| 5,835,935 A | 11/1998 | Estakhri et al. |
| 5,838,614 A | 11/1998 | Estakhri et al. |
| 5,893,920 A | 4/1999 | Shaheen et al. |
| 6,134,584 A | 10/2000 | Chang et al. |
| 6,138,158 A | 10/2000 | Boyle et al. |
| 6,185,625 B1 | 2/2001 | Tso et al. |
| 6,217,752 B1 | 4/2001 | Coots |
| 6,366,912 B1 | 4/2002 | Wallent et al. |
| 6,393,465 B2 | 5/2002 | Leeds |
| 6,453,383 B1 | 9/2002 | Stoddard et al. |
| 6,542,964 B1 | 4/2003 | Scharber |
| 6,542,967 B1 | 4/2003 | Major |
| 6,553,393 B1 | 4/2003 | Eilbott et al. |
| 6,598,121 B2 | 7/2003 | Challenger et al. |
| 6,742,033 B1 | 5/2004 | Smith et al. |
| 6,799,251 B1 | 9/2004 | Jacobs et al. |
| 6,826,599 B1 | 11/2004 | Shaffer et al. |
| 6,917,960 B1 | 7/2005 | Decasper et al. |
| 6,937,813 B1 | 8/2005 | Wilson |
| 6,996,676 B2 | 2/2006 | Megiddo et al. |
| 7,043,506 B1 | 5/2006 | Horvitz |
| 7,043,524 B2 | 5/2006 | Shah et al. |
| 7,103,598 B1 | 9/2006 | Clement |
| 7,155,519 B2 | 12/2006 | Lo et al. |
| 7,167,840 B1 | 1/2007 | Seidman et al. |
| 7,246,139 B2 | 7/2007 | Andoh |
| 7,246,268 B2 | 7/2007 | Craig et al. |
| 7,248,861 B2 | 7/2007 | Lazaridis et al. |
| 7,269,851 B2 | 9/2007 | Ackroyd |
| 7,289,563 B2 | 10/2007 | Yamamoto |
| 7,305,473 B2 | 12/2007 | Vogt |
| 7,317,907 B2 | 1/2008 | Linkert et al. |
| 7,356,591 B2 | 4/2008 | Mousseau et al. |
| 7,395,048 B2 | 7/2008 | Kotzin |
| 7,428,540 B1 | 9/2008 | Coates et al. |
| 7,430,633 B2 | 9/2008 | Church et al. |
| 7,472,247 B2 | 12/2008 | Vitanov et al. |
| 7,483,871 B2 | 1/2009 | Herz |
| 7,512,666 B2 | 3/2009 | Zhou |
| 7,512,847 B2 | 3/2009 | Bychkov et al. |
| 7,523,013 B2 | 4/2009 | Gorobets et al. |
| 7,525,570 B2 | 4/2009 | Kiely |
| 7,549,164 B2 | 6/2009 | Cook et al. |
| 7,568,075 B2 | 7/2009 | Fujibayashi et al. |
| 7,574,580 B2 | 8/2009 | Mahashin et al. |
| 7,650,630 B2 | 1/2010 | Yamada et al. |
| 7,689,805 B2 | 3/2010 | Moore et al. |
| 7,783,956 B2 | 8/2010 | Ko et al. |
| 7,975,305 B2 | 7/2011 | Rubin et al. |
| 8,001,217 B1* | 8/2011 | Pan et al. ................. 709/219 |
| 8,037,527 B2 | 10/2011 | Milener et al. |
| 2001/0000083 A1 | 3/2001 | Crow et al. |
| 2002/0165825 A1 | 11/2002 | Matsushima et al. |
| 2002/0194382 A1 | 12/2002 | Kausik et al. |
| 2003/0009538 A1 | 1/2003 | Shah et al. |
| 2003/0023745 A1* | 1/2003 | Noe ........................... 709/235 |
| 2003/0033308 A1 | 2/2003 | Patel et al. |
| 2003/0114138 A1 | 6/2003 | Ramaswamy et al. |
| 2003/0115420 A1 | 6/2003 | Tsirigotis et al. |
| 2003/0166399 A1 | 9/2003 | Tokkonen et al. |
| 2003/0172236 A1 | 9/2003 | Iyengar et al. |
| 2003/0187960 A1 | 10/2003 | Koba et al. |
| 2003/0189589 A1 | 10/2003 | LeBlanc et al. |
| 2003/0236961 A1 | 12/2003 | Qiu et al. |
| 2004/0049579 A1 | 3/2004 | Ims et al. |
| 2004/0117586 A1 | 6/2004 | Estakhri et al. |
| 2004/0122873 A1 | 6/2004 | Wright |
| 2004/0127235 A1* | 7/2004 | Kotzin ........................ 455/466 |
| 2004/0221018 A1 | 11/2004 | Ji |
| 2004/0221118 A1 | 11/2004 | Slater et al. |
| 2004/0221130 A1 | 11/2004 | Lai et al. |
| 2004/0260880 A1 | 12/2004 | Shannon et al. |
| 2005/0039177 A1 | 2/2005 | Burke |
| 2005/0076063 A1 | 4/2005 | Andoh |
| 2005/0097278 A1 | 5/2005 | Hsu et al. |
| 2005/0102291 A1 | 5/2005 | Czuchry et al. |
| 2005/0132286 A1 | 6/2005 | Rohrabaugh et al. |
| 2005/0246543 A1 | 11/2005 | Ezaki et al. |
| 2005/0273514 A1 | 12/2005 | Milkey et al. |
| 2006/0008256 A1 | 1/2006 | Khedouri et al. |
| 2006/0010154 A1 | 1/2006 | Prahlad et al. |
| 2006/0020745 A1 | 1/2006 | Conley et al. |
| 2006/0021032 A1 | 1/2006 | Challener et al. |
| 2006/0059326 A1 | 3/2006 | Aasheim et al. |
| 2006/0064555 A1 | 3/2006 | Prahlad et al. |
| 2006/0075068 A1 | 4/2006 | Kasriel et al. |
| 2006/0075424 A1 | 4/2006 | Talstra et al. |
| 2006/0080664 A1 | 4/2006 | Jawahar et al. |
| 2006/0107062 A1 | 5/2006 | Fauthoux |
| 2006/0136446 A1 | 6/2006 | Hughes et al. |
| 2006/0161604 A1 | 7/2006 | Lobo |
| 2006/0161960 A1 | 7/2006 | Benoit |
| 2006/0168123 A1 | 7/2006 | Krstulich |
| 2006/0168129 A1 | 7/2006 | Van Geest et al. |
| 2006/0168403 A1 | 7/2006 | Kolovson |
| 2006/0200503 A1 | 9/2006 | Dosa et al. |
| 2006/0218304 A1 | 9/2006 | Mukherjee et al. |
| 2006/0218347 A1 | 9/2006 | Oshima |
| 2006/0256012 A1 | 11/2006 | Fok et al. |
| 2006/0259715 A1 | 11/2006 | Getzin et al. |
| 2006/0282886 A1 | 12/2006 | Gaug |
| 2006/0294223 A1 | 12/2006 | Glasgow et al. |
| 2007/0005928 A1 | 1/2007 | Trika et al. |
| 2007/0033335 A1 | 2/2007 | Maeda et al. |
| 2007/0088659 A1 | 4/2007 | Phillips |
| 2007/0100893 A1 | 5/2007 | Sanders |
| 2007/0112862 A1 | 5/2007 | Iwatsu et al. |
| 2007/0156845 A1 | 7/2007 | Devanneaux et al. |
| 2007/0156998 A1 | 7/2007 | Gorobets |
| 2007/0157217 A1 | 7/2007 | Jacobs et al. |
| 2007/0165933 A1 | 7/2007 | Thomas et al. |
| 2007/0179854 A1 | 8/2007 | Ziv et al. |
| 2007/0185899 A1 | 8/2007 | Ziv et al. |
| 2007/0198716 A1 | 8/2007 | Knowles et al. |
| 2007/0220220 A1 | 9/2007 | Ziv et al. |
| 2007/0233947 A1 | 10/2007 | Coulson et al. |
| 2007/0276949 A1 | 11/2007 | Mergi et al. |
| 2008/0005459 A1 | 1/2008 | Norman |
| 2008/0005657 A1 | 1/2008 | Sneh |
| 2008/0010310 A1* | 1/2008 | Sprowls ...................... 707/102 |
| 2008/0010372 A1 | 1/2008 | Khedouri et al. |
| 2008/0016174 A1 | 1/2008 | Schiavone et al. |
| 2008/0046449 A1 | 2/2008 | Lee et al. |
| 2008/0068998 A1 | 3/2008 | Jaggi et al. |
| 2008/0077550 A1 | 3/2008 | Shike |
| 2008/0082736 A1 | 4/2008 | Chow et al. |
| 2008/0091878 A1 | 4/2008 | Stern et al. |
| 2008/0098093 A1 | 4/2008 | Simon et al. |
| 2008/0098169 A1 | 4/2008 | Kaluskar et al. |
| 2008/0127355 A1 | 5/2008 | Lorch et al. |
| 2008/0177935 A1 | 7/2008 | Lasser et al. |
| 2008/0189796 A1 | 8/2008 | Linn et al. |
| 2008/0201754 A1 | 8/2008 | Arling |
| 2008/0208961 A1 | 8/2008 | Kim et al. |
| 2008/0222348 A1 | 9/2008 | Mosek |
| 2008/0235520 A1 | 9/2008 | Becker et al. |
| 2008/0243773 A1 | 10/2008 | Patel et al. |
| 2008/0244074 A1 | 10/2008 | Baccas et al. |
| 2008/0244201 A1 | 10/2008 | Heintel et al. |
| 2008/0263113 A1 | 10/2008 | Krishnaiyer et al. |
| 2008/0281883 A1 | 11/2008 | Cannon et al. |
| 2009/0055351 A1 | 2/2009 | Whitehorn et al. |
| 2009/0089366 A1 | 4/2009 | Toth |

(56) References Cited

U.S. PATENT DOCUMENTS

| | | | |
|---|---|---|---|
| 2009/0132621 A1 | 5/2009 | Jensen et al. | |
| 2009/0181655 A1* | 7/2009 | Wallace et al. | 455/414.3 |
| 2009/0204682 A1 | 8/2009 | Jeyaseelan et al. | |
| 2009/0210631 A1 | 8/2009 | Bosworth et al. | |
| 2009/0222117 A1 | 9/2009 | Kaplan et al. | |
| 2009/0234865 A1 | 9/2009 | BBillum et al. | |
| 2009/0327712 A1 | 12/2009 | Sarig | |
| 2010/0017557 A1 | 1/2010 | Nakanishi et al. | |
| 2010/0030963 A1 | 2/2010 | Marcu et al. | |
| 2010/0049758 A1 | 2/2010 | Kumar | |
| 2010/0115048 A1* | 5/2010 | Scahill | 709/213 |
| 2010/0121712 A1 | 5/2010 | Shahshahani et al. | |
| 2010/0146187 A1 | 6/2010 | Grimsrud et al. | |
| 2010/0153474 A1 | 6/2010 | Raines et al. | |
| 2010/0235329 A1 | 9/2010 | Koren et al. | |
| 2010/0235473 A1 | 9/2010 | Koren et al. | |
| 2011/0010497 A1 | 1/2011 | Bryant-Rich et al. | |
| 2011/0099326 A1 | 4/2011 | Jung et al. | |
| 2011/0179143 A1 | 7/2011 | Yairi | |
| 2012/0005752 A1 | 1/2012 | Sprowls | |

FOREIGN PATENT DOCUMENTS

| | | |
|---|---|---|
| EP | 0 492 106 | 4/2000 |
| EP | 1211861 | 6/2002 |
| EP | 1308853 | 5/2003 |
| EP | 1445703 | 8/2004 |
| EP | 1489510 | 12/2004 |
| EP | 1 923 780 A1 | 5/2008 |
| FR | 2793576 | 5/1999 |
| GB | 2349546 | 11/2000 |
| GB | 2350973 | 12/2000 |
| JP | 2005 169861 | 6/2005 |
| KR | 1020090012308 | 2/2009 |
| WO | WO 00/41510 | 7/2000 |
| WO | WO 02/060154 | 8/2002 |
| WO | WO 02/100117 | 12/2002 |
| WO | WO 03/021441 | 3/2003 |
| WO | WO 03/094474 | 11/2003 |
| WO | WO 2004/068369 | 8/2004 |
| WO | WO 2005/022942 | 3/2005 |
| WO | WO 2005/109302 | 11/2005 |
| WO | WO 2007/044899 | 4/2007 |
| WO | WO 2007/117251 | 10/2007 |
| WO | WO 2007/138584 | 12/2007 |
| WO | WO 2009/088709 A2 | 7/2009 |
| WO | WO 2010/074848 | 7/2010 |
| WO | WO 2010/104814 | 9/2010 |

OTHER PUBLICATIONS

International Search Report and Written Opinion for PCT Patent Application Serial No. PCT/US2010/026596, dated Jul. 29, 2010, 15 pages.
International Search Report and Written Opinion for PCT Patent Application Serial No. PCT/US2009/065456, dated Apr. 9, 2010, 11 pages.
International Search Report and Written Opinion for PCT Patent Application Serial No. PCT/US2009/065056, dated Jul. 29, 2010, 35 pages.
Jiang, Zhimei et al., "Web Prefetching in a Mobile Environment", IEEE Personal Communications, IEEE Communications Society, US, vol. 5, No. 5, Oct. 1998, pp. 25-34.
O'Hare, Gregory et al., "Addressing Mobile HCI Needs Through Agents", Proceedings of the 4th International Symposium on Human Computer Interaction with Mobile Devices and Services (MobileHCI'02), Pisa, Italy, 2002, pp. 311-314. Spinger Verlag LNCS 2411.
"Android Data Caching", Process Fork, http://processfork.blogspot.com/2010/04/android-data-caching.html, Apr. 21, 2010, 2 pages.
"Cisco MDS 9000 Series Caching Services Module with IBM TotalStorage™ SAN Volume Controller Storage Software for Cisco MDS 9000", Cisco Systems, Inc., http://www.cisco.com/warp/public/cc/pd/ps4159/ps4358/prodlit/md9ds_ds.pdf, printed on Dec. 7, 2010, 9 pages.
"Persistant Caching", IBM® Cognos® 8 Virtual Manager Installation and Configuration Guide, http://publib.boulder.ibm.com/infocenter/c8bi/v8r4m0/index.jsp?topic=/com.ibm.swg.im.cognos.vvm_installation_guide.8.4.0.doc/vvm_installation_guide_id1555PersistentCaching.html, Nov. 27, 2009, 1 page.
Cache Management for the IBM Virtual Taper Server, http://www-03.ibm.com/support/techdocs/atsmastr.nsf/WebIndex/FLASH10054, printed on Jan. 3, 2011, 5 pages.
International Search Report and Written Opinion dated May 7, 2008 for PCT Application Serial No. PCT/IL2008/000126, 12 pages.
International Search Report and Written Opinion dated Oct. 26, 2009 for PCT Application Serial No. PCT/IL2009/000752, 11 pages.
Xiang et al., "Cost-Based Replacement Policy for Multimedia Proxy Across Wireless Internet", IEEE Global Telecommunications Conference, GLOBECOM '01, San Antonio, TX, Nov. 25-29, 2001, pp. 2009-2013.
Yin et al., "A Generalized Target-Driven Cache Replacement Policy for Mobile Environments", Proceedings of the 2003 Symposium on Applications and the Internet (SAINT '03), pp. 1-20.
Ex Parte Quayle Action for U.S. Appl. No. 12/644,885, dated Dec. 7, 2011, 5 pages.
International Report on Patentability issued in International Application No. PCT/IL2009/000752, mailed Feb. 17, 2011, 2 pages.
International Search Report and Written Opinion for PCT/US2011/047270, dated Dec. 20, 2011, 13 pages.
International Search Report for PCT/IB2011/001206, mailed Aug. 30, 2011, 5 pages.
Office Action for U.S. Appl. No. 12/020,553, dated Dec. 19, 2011, 20 pages.
Office Action for U.S. Appl. No. 12/020,553, dated May 12, 2011, 19 pages.
Office Action for U.S. Appl. No. 12/185,583, dated Jun. 6, 2011, 13 pages.
Office Action for U.S. Appl. No. 12/185,583, dated Jan. 31, 2012, 17 pages.
Office Action for U.S. Appl. No. 12/336,089, dated Apr. 13, 2011, 14 pages.
Office Action for U.S. Appl. No. 12/336,089, dated Oct. 31, 2011, 14 pages.
Office Action for U.S. Appl. No. 12/645,149, dated Jan. 26, 2012, 9 pages.
Office Action for U.S. Appl. No. 12/645,194, dated Dec. 8, 2011, 26 pages.
Office Action for U.S. Appl. No. 12/720,282, dated Dec. 1, 2011, 14 pages.
Restriction Requirement for U.S. Appl. No. 12/494,758, dated Nov. 21, 2011, 6 pages.
Written Opinion for PCT/IB2011/001206, mailed Aug. 30, 2011, 6 pages.
Written Opinion of the International Searching Authority issued in International Application No. PCT/IL2009/000752, mailed Feb. 17, 2011, 4 pages.
Douglis et al., "Position: Short Object Lifetimes Require a Delete-Optimized Storage System", Proceedings of the 11th Workshop on ACM SIGOPS European Workshop, ACM, 2004, pp. 1-6.
Rigoutsos et al., "Chung-Kwei: A Pattern-Discovery-Based System for the Automatic Identification of Unsolicited E-Mail Messages (SPAM)", Proceedings of the First Conference on Email and Anti-Spam (CEAS), Bioinformatics and Pattern Discovery Group, IBM, 2004.
U.S. Appl. No. 61/159,034, filed Mar. 10, 2009, entitled, "Smart Caching", Inventors: Judah Gamliel Hahn and David Koren (24 pages).
Office Action for U.S. Appl. No. 12/336,089, dated Jul. 25, 2012, 17 pages.
Office Action for U.S. Appl. No. 12/645,149, dated May 8, 2012, 9 pages.
Office Action for U.S. Appl. No. 12/645,194, dated Aug. 22, 2012, 30 pages.

(56) References Cited

OTHER PUBLICATIONS

Office Action for U.S. Appl. No. 12/720,282, dated May 1, 2012, 12 pages.
Office Action for U.S. Appl. No. 12/720,333, dated May 11, 2012, 7 pages.
Office Action for U.S. Appl. No. 12/796,267, dated Jul. 30, 2012, 23 pages.
Office Action for U.S. Appl. No. 12/895,428, dated May 25, 2012, 15 pages.
Office Action for U.S. Appl. No. 13/172,589, dated Jul. 26, 2012, 15 pages.
International Search Report and Written Opinion for PCT/US2011/047047, dated May 8, 2012, 12 pages.
International Search Report for PCT/US2012/020502, dated Jul. 10, 2012, 3 pages.
Written Opinion for PCT/US2012/020502, dated Jul. 10, 2012, 6 pages.
Partial International Search Report and Invitation to Pay Additional Fees for PCT/US2012/020767, dated Aug. 27, 2012, 9 pages.
Chandra et al., "Automated Storage Reclamation Using Temporal Importance Annotations", *27th International Conference on Distributed Computing Systems (ICDCS'07)*, IEEE, pp. 1-10, 2007.
Office Action for U.S. Appl. No. 12/336,089, dated Mar. 22, 2012, 8 pages.
Office Action for U.S. Appl. No. 12/796,267, dated Feb. 10, 2012, 22 pages.
Office Action for U.S. Appl. No. 13/172,589, dated Mar. 22, 2012, 9 pages.
Notice of Allowance for U.S. Appl. No. 12/644,885, dated Feb. 16, 2012, 9 pages.
Deng et al., "Architectures and Optimization Methods of Flash Memory Based Storage Systems", *Journal of Systems Architecture*, vol. 57, pp. 214-227, 2011.
Notification Concerning Transmittal of International Preliminary Report on Patentability for International Application No. PCT/US2009/065456, dated Jun. 30, 2011, 9 pages.
Notification Concerning Transmittal of International Preliminary Report on Patentability for International Application No. PCT/US2009/065056, dated Jun. 30, 2011, 27 pages.
Notification Concerning Transmittal of International Preliminary Report on Patentability for International Application No. PCT/US2010/026596, dated Sep. 22, 2011, 10 pages.
Notification of Transmittal of the International Search Report and the Written Opinion of the International Searching Authority, or the Declaration for International Application No. PCT/US2011/047270, dated Dec. 20, 2011, 13 pages.
Reddy, Mike et al., An Adaptive Mechanism for Web Browser Cache Management, date unknown, 6 pages.
U.S. Appl. No. 13/341,783, filed Dec. 30, 2011, entitled, "System and Method for Managing Discardable Objects", 54 pages.
U.S. Appl. No. 13/341,785, filed Dec. 30, 2011, entitled, "System and Method for Managing Discardable Objects", 54 pages.
Office Action issued in U.S. Appl. No. 13/327,383, dated Dec. 6, 2013 (15 pages).

* cited by examiner

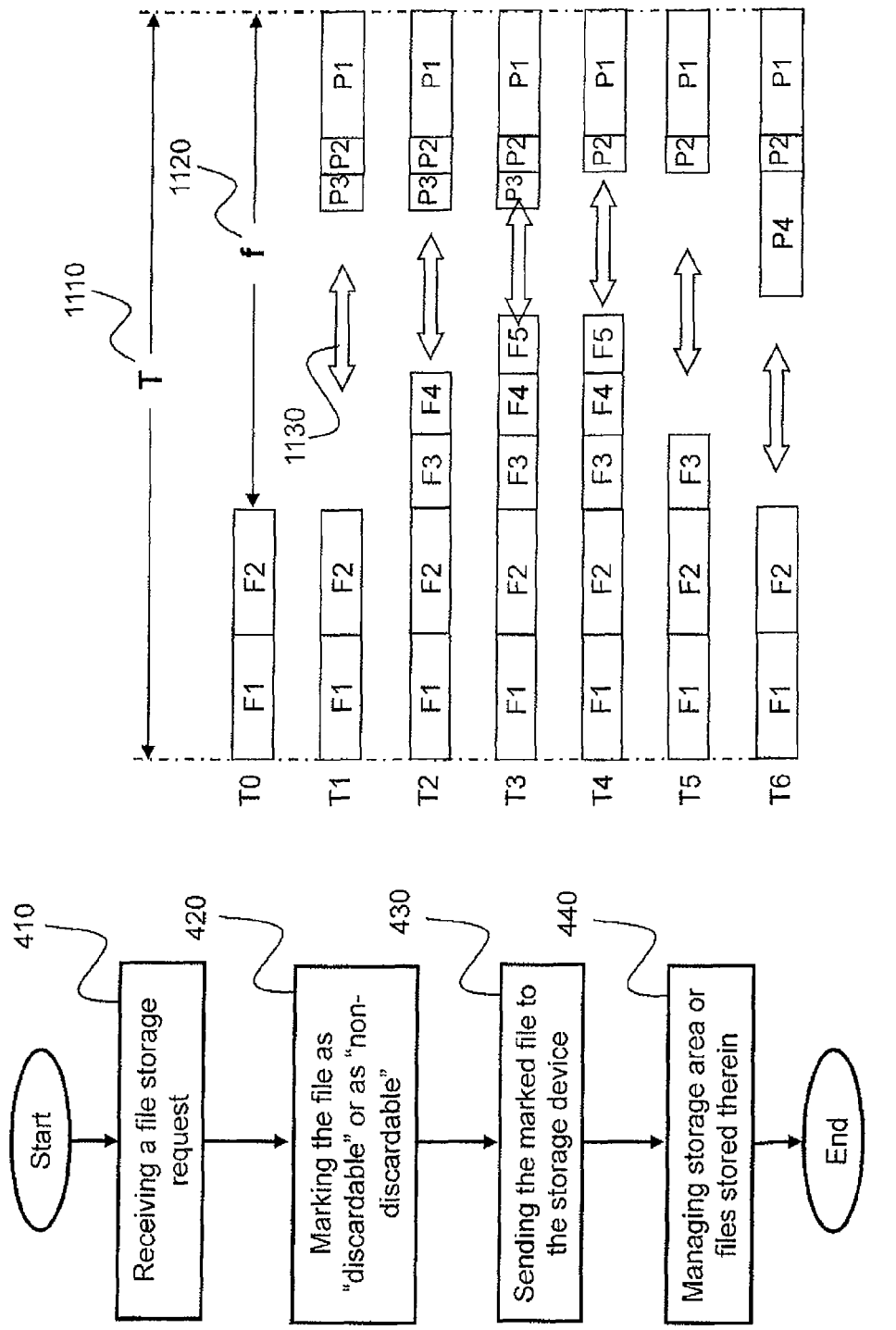

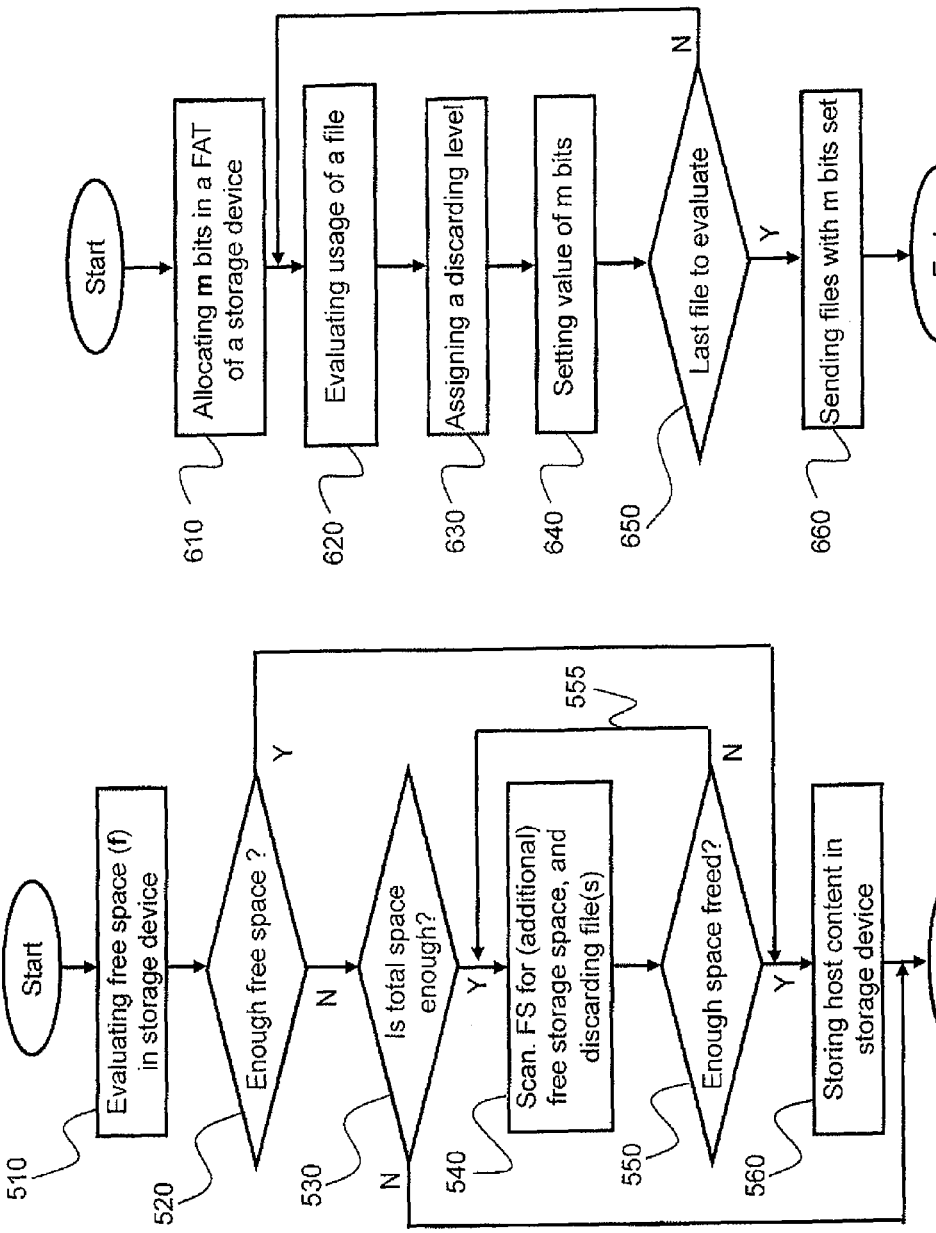

Fig. 7

| DOS Filename | Extension | Attributes | FCN (high) | FCN (low) | File Size |
|---|---|---|---|---|---|
| "REALFILE" | "DAT" | "00" | 0000 | 0002 | 0000 24E4 |
| "\xE5CONSIGN" | "000" | "00" | 0000 | 0005 | 0000 8880 |
| "\xE5CONSIGN" | "001" | "00" | 0000 | 000E | 0000 1400 |

710 — DOS Filename
720 — Extension
730 — Attributes
740 — FCN (high)
750 — FCN (low)
760 — File Size
700
755
770
780
790

Fig. 8

| F8FF FFFF (cluster #0) | 0000 0000 (cluster #1) | 0000 0003 (cluster #2) | 0000 0004 (cluster #3) | 0FFF FFFF (cluster #4) | 1000 0006 (cluster #5) |
|---|---|---|---|---|---|
| 1000 0007 (cluster #6) | 1000 0008 (cluster #7) | 1000 0009 (cluster #8) | 1000 000A (cluster #9) | 1000 000B (cluster #10) | 1000 000C (cluster #11) |
| 1FFF FFFF (cluster #12) | F000 0010 (cluster #13) | 0000 0000 (cluster #14) | FFFF FFFF (cluster #15) | 0000 0000 (cluster #16) | 0000 0000 (cluster #17) |
| 0000 0000 (cluster #18) | 0000 0000 (cluster #19) | 0000 0000 (cluster #20) | 0000 0000 (cluster #21) | 0000 0000 (cluster #22) | 0000 0000 (cluster #23) |

800
810, 820, 825, 840, 850, 830
860, 210, 870

| F8FF FFFF (cluster #0) | 0000 0000 (cluster #1) | 0000 0003 (cluster #2) | 0000 0004 (cluster #3) | 0FFF FFFF (cluster #4) | 0000 0000 (cluster #5) |
| --- | --- | --- | --- | --- | --- |
| 1000 0007 (cluster #6) | 1000 0008 (cluster #7) | 1000 0009 (cluster #8) | 1000 000A (cluster #9) | 1000 000B (cluster #10) | 1FFF FFFF (cluster #11) |
| 0000 0000 (cluster #12) | 0000 0000 (cluster #13) | 0000 0000 (cluster #14) | 0000 0000 (cluster #15) | 0000 0000 (cluster #16) | 0000 0000 (cluster #17) |
| 0000 0000 (cluster #18) | 0000 0000 (cluster #19) | 1000 0015 (cluster #20) | 1000 0016 (cluster #21) | 1FFF FFFF (cluster #22) | 0000 0000 (cluster #23) |

Fig. 12a

| 0000 0000 (cluster #0) | 0000 0000 (cluster #1) | 0000 0000 (cluster #2) | 0000 0000 (cluster #3) | 0000 0000 (cluster #4) | 0000 0000 (cluster #5) |
| --- | --- | --- | --- | --- | --- |
| 1000 0007 (cluster #6) | 1000 0008 (cluster #7) | 1000 0009 (cluster #8) | 1FFF FFFF (cluster #9) | 1000 000B (cluster #10) | 1FFF FFFF (cluster #11) |
| 0000 0000 (cluster #12) | 0000 0000 (cluster #13) | 0000 0000 (cluster #14) | FFFF FFFF (cluster #15) | 0000 0000 (cluster #16) | 0000 0000 (cluster #17) |
| 0000 0000 (cluster #18) | 0000 0000 (cluster #19) | 1000 0015 (cluster #20) | 1000 0016 (cluster #21) | 1FFF FFFF (cluster #22) | 0000 0000 (cluster #23) |

Fig. 12b

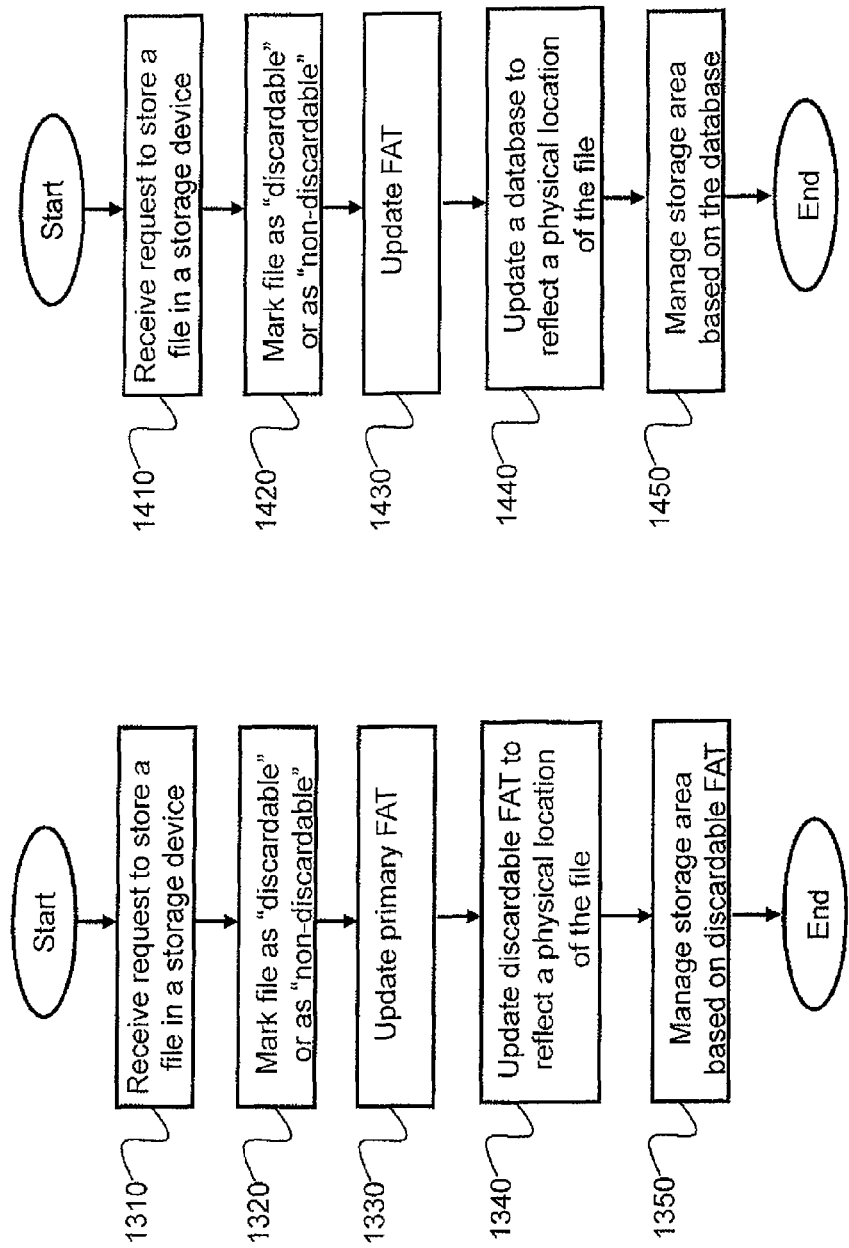

| F8FF FFFF (cluster #0) | 0000 0000 (cluster #1) | 0000 0000 (cluster #2) | 0000 0003 (cluster #3) | 0FFF FFFF (cluster #4) | 0000 0000 (cluster #5) |
|---|---|---|---|---|---|
| 0000 0000 (cluster #6) | 1000 0012 (cluster #7) | 0000 0000 (cluster #8) | 1000 0007 (cluster #9) | 0000 0000 (cluster #10) | 0000 0000 (cluster #11) |
| 0000 0000 (cluster #12) | 1000 0009 (cluster #13) | 0000 0000 (cluster #14) | 0000 0000 (cluster #15) | 0000 0000 (cluster #16) | 0000 0000 (cluster #17) |
| 1000 0015 (cluster #18) | 0000 0000 (cluster #19) | 0000 0000 (cluster #20) | 1FFF FFFF (cluster #21) | 0000 0000 (cluster #22) | 0000 0000 (cluster #23) |

Fig. 16

| 0000 0000 (cluster #0) | 0000 0000 (cluster #1) | 0000 0000 (cluster #2) | 0000 0004 (cluster #3) | 0FFF FFFF (cluster #4) | 1000 0016 (cluster #5) |
|---|---|---|---|---|---|
| 0000 0000 (cluster #6) | 1000 0012 (cluster #7) | 0000 0000 (cluster #8) | 1000 0007 (cluster #9) | 1FFF FFFF (cluster #10) | 0000 0000 (cluster #11) |
| 0000 0000 (cluster #12) | 1000 0009 (cluster #13) | 0000 0000 (cluster #14) | 0000 0000 (cluster #15) | 0000 0000 (cluster #16) | 1000 0005 (cluster #17) |
| 1000 0015 (cluster #18) | 0000 0000 (cluster #19) | 0000 0000 (cluster #20) | 1FFF FFFF (cluster #21) | 1000 000A (cluster #22) | 0000 0000 (cluster #23) |

Fig. 17

| | Reserved (24 Bits) | Properties (Read) (1 Bit) | Properties (Write) (1 Bit) | Priority (1 Bit) | Preview Read (1 Bit) | Preview Write (1 Bit) | Read (1 Bit) | Write (1 Bit) | Convert (1 Bit) |
|---|---|---|---|---|---|---|---|---|---|
| Owner / Downloader | - | 1 | 1 | 1 | 1 | 1 | 1 | 1 | 0 |
| Policy Manager | - | 1 | 0 | 1 | 1 | 0 | 0 | 0 | 0 |
| Player | - | 1 | 0 | 0 | 1 | 0 | 0 | 0 | 0 |
| Billing Manager | - | 1 | 0 | 0 | 1 | 0 | 0 | 0 | 1 |
| System (Package, Setting & Phone) | - | 1 | 1 | 0 | 1 | 0 | 0 | 0 | 0 |
| | 2002 | 2004 | 2006 | 2008 | 2010 | 2012 | 2014 | 2016 |

Fig. 20

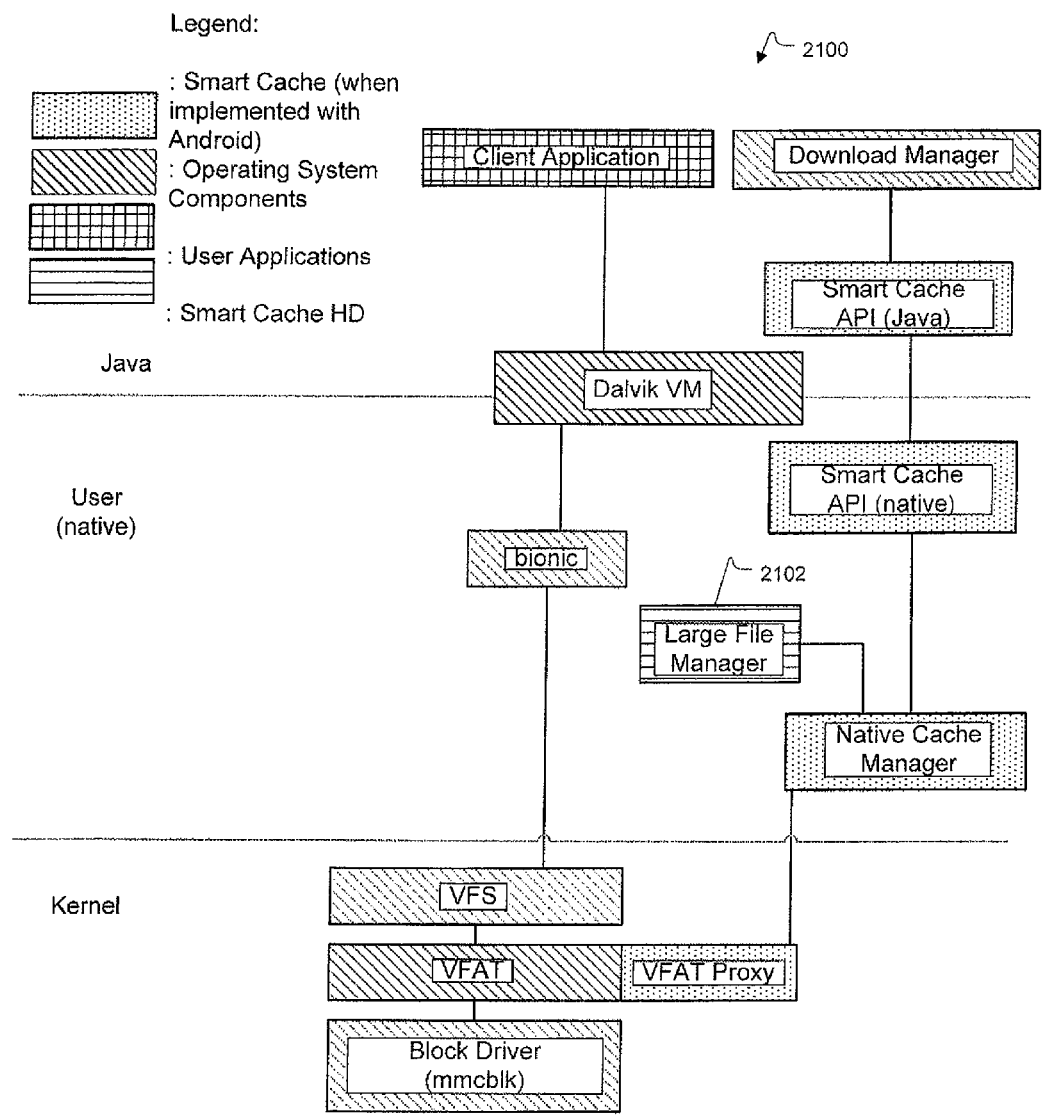
Figure 21: Smart Caching HD Components

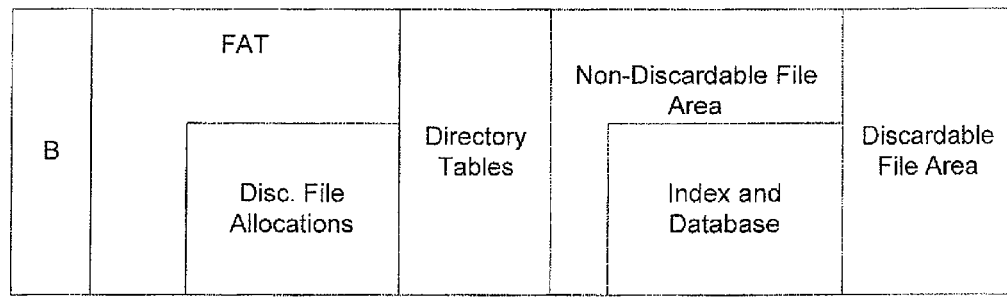
Figure 22: Discardable Files – File System Structure
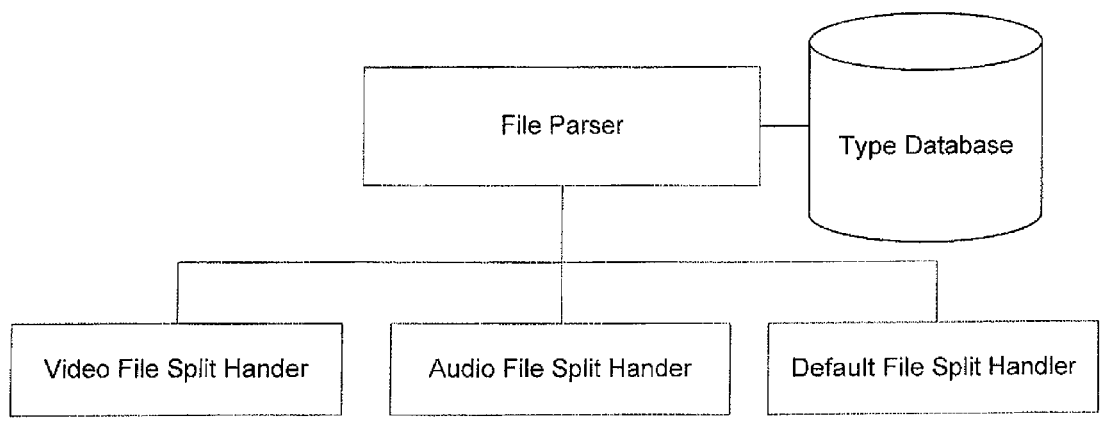
Figure 23: Large File Manager Figure 26: Matroska file structure Figure 27: Split Matroska File

DOWNLOAD MANAGEMENT OF DISCARDABLE FILES

PRIORITY CLAIM

The present application claims the benefit of both U.S. Provisional Pat. App. No. 61/159,034, filed Mar. 10, 2009, and U.S. Provisional Pat. App. No. 61/259,418, filed Nov. 9, 2009, and is a continuation-in-part of U.S. patent application Ser. No. 12/645,194 (pending), filed Dec. 22, 2009, which is a continuation of PCT App. No. PCT/US2009/65056 (pending), filed Nov. 19, 2009, which claims priority to U.S. Provisional Pat. App. No. 61/159,034, filed Mar. 10, 2009, claims priority to Indian Pat. App. No. 2238/MUM/2009 (pending), filed Sep. 25, 2009, and is a continuation-in-part of U.S. patent application Ser. No. 12/336,089 (pending), filed Dec. 16, 2008, wherein the entirety of each of which are hereby incorporated by reference.

FIELD OF THE INVENTION

The present invention generally relates to storage devices and more specifically to a method and to a device for managing files in a storage device.

BACKGROUND

Use of non-volatile storage devices has been rapidly increasing over the years because they are portable and they have small physical size and large storage capacity. Storage devices come in a variety of designs. Some storage devices are regarded as "embedded", meaning that they cannot, and are not intended to be removed by a user from a host device with which they operate. Other storage devices are removable, which means that the user can move them from one host device (e.g., from a digital camera) to another, or replace one storage device with another.

The digital content stored in a storage device can originate from a host of the storage device. For example, a digital camera, an exemplary host, captures images and translates them into corresponding digital data. The digital camera then stores the digital data in a storage device with which it operates. Digital content that is stored in a storage device may also originate from a remote source: it can be sent to a host of the storage device, for example, over a data network (e.g., the Internet) or a communication network (e.g., a cellular phone network), and then be downloaded by the host to the storage device. The remote source may be, for example, a service provider or a content provider. Service providers and content providers are collectively referred to hereinafter as "publishers".

As storage devices within mobile handsets grow in size and capabilities, new scenarios for content acquisition and consumption on the go become available. Typically, handsets can be used to consume movies and music downloaded from operator-controlled servers, market applications such as Apple's iTunes service, and side-loaded from sources such as SanDisk's slotMedia cards. However, in all of these applications, the user must proactively seek the content he wishes to consume, indicate and authorize the acquisition of the content, acquire the content, and then consume it. This reduces the ability of content owners to offer content for instant consumption, and the ability of the user to immediately see what he acquires without waiting for it to download.

A number of product initiatives have been created around preloading content to the user, but they all suffer from one common drawback: the user must sacrifice his own storage capacity in order to store content, but cannot access this content until after purchasing it. Users who have to purchase this capacity do not generally want to see a significant portion of it allocated to content that they cannot actually use.

Users of storage devices can willingly download media content and advertisements by requesting the media content or the advertisements from publishers. However, sometimes, publishers, trying to increase their income, send content to users without asking their permission, and sometimes even without the users being aware that such content was downloaded to their storage devices. Content that a publisher sends to users without getting their consent are referred to herein as "unsolicited content". Oftentimes, unsolicited content is intended to be consumed by users after paying, or after committing to pay, the publisher a fee.

By downloading unsolicited content to users' storage devices publishers hope that users will eventually consume the unsolicited content for a fee, thus increasing their income. The practice of publishers storing unsolicited contents on storage devices without asking users' consent, hoping that the users will consume these contents for a fee, is a concept known in the media publishing field as "predictive consignment". However, unsolicited content may remain stored in a storage device without the user of the storage device knowing of its existence or wanting to consume it. Storing unsolicited content in a storage device reduces the available (i.e., free) user storage space on the storage device, which is undesirable from the user's point of view. A user may find that there is less space in the storage device for the user's own content (e.g., a music file) because someone else (i.e., some publisher) has taken over part of the storage space on the storage device, or that the user may have to reclaim the storage space so taken by deleting the unsolicited content.

One partial solution to the problem of taking over parts of the user's storage space involves blocking publishers' access to the storage device, such as by blocking the publisher's website. This solution may be acceptable for the users but it is problematic from the publishers' point of view because publishers will make fewer sales and lose a potential income source. Another partial solution to this problem involves publishing content to hosts (i.e., storing content files in storage devices of these hosts) and removing the content when it becomes irrelevant. In other words, the publisher that originated the content removes the stored unsolicited content from the storage device when the content becomes irrelevant. An unsolicited content is regarded as irrelevant if the time for its consumption has lapsed, or when there are indications that the user is not likely to consume it.

Thus, there develops a need for a new technology that intelligently manages handset storage, such that a user is free to use their storage without penalty, while still enabling content owners to push content to handsets. Stated another way, there is therefore a need to address the problem with unsolicited files. Specifically, while publishers should be allowed to pursue downloads to storage devices of unsolicited content in the course of conducting their business, these downloads should not have a materially deterring effect on the user experience.

SUMMARY

It would, therefore, be beneficial to be able to store unsolicited files in a storage device for as long as the storage space required to accommodate them in the storage device is not required for user's files, and to remove unsolicited files from the storage device in order to guarantee a minimum size of free storage space for user files. Various embodiments are designed to implement such files management, examples of which are provided herein.

To address the foregoing, files stored, or files to be stored, in a storage device are marked either as non-discardable or discardable in a structure of a file system associated with the storage device. Each marked file has associated with it a discarding priority level. A new publisher's file (i.e., an unsolicited file) is permitted to be stored in the storage device only if storing it in the storage device does not narrow a storage usage safety margin, which is reserved for user files, beyond a desired margin. User files, on the other hand, are allowed to be stored in the storage device even if their storage narrows the storage usage safety margin beyond the desired width. However, in such cases, the desired width of the storage usage safety margin is restored by removing one or more discardable files from the storage device. A discardable file is removed from the storage device if its discarding priority level equals or is higher (or lower, as explained herein) than a predetermined discarding threshold value.

A download manger, which in some implementations may be part of a storage allocator, both of which may be present in a host, a storage device, or a combination of both, manages a download of a discardable to a storage area of a storage device based on one or more download conditions. A request is received to store a file in a storage area of a storage area of a storage device, the file being a discardable file and having associated therewith data in a data structure associated with the storage device. In some implementations, the data structure may comprise a file system structure associated with the storage device. The file is marked as a discardable file. In some implementations, the file system structure of the data structure associated with the discardable file is marked to indicate that the file is a discardable file. In other implementations, the file itself is marked as a discardable file.

The download manager determines a download condition associated with the request to store the discardable file in the storage area of the storage device and the download manager determines whether to delay a download to the storage device of the discardable file based on the determined download condition. The download manager manages the download of the discardable file to the storage device based on the determination of whether to delay the download of the discardable file to the storage device. In some implementations, the download manager may delay the download of the discardable file to the storage device unit a parameter associated with the download condition is satisfied. A storage allocator, which may include the download manager, then manages the storage of the downloaded discardable file in the storage area of the storage device based on the marking of the file is a discardable file.

BRIEF DESCRIPTION OF THE DRAWINGS

Various exemplary embodiments are illustrated in the accompanying figures with the intent that these examples not be restrictive. It will be appreciated that for simplicity and clarity of the illustration, elements shown in the figures referenced below are not necessarily drawn to scale. Also, where considered appropriate, reference numerals may be repeated among the figures to indicate like, corresponding or analogous elements. Of the accompanying figures:

FIG. 4 is a method for managing files according to an example embodiment.

FIG. 5 is a method for managing the storage of discardable files in a storage device according to an example embodiment.

FIG. 6 is a method for marking one or more unsolicited files in a FAT32-structured file system according to an example embodiment.

FIG. 7 is an exemplary directory area associated with a FAT32 table.

FIG. 8 is a FAT32 table according to an example embodiment.

FIG. 11 demonstrates files' storage management method in accordance with the present disclosure.

FIG. 12$a$ illustrates an exemplary primary FAT.

FIG. 12$b$ illustrates an exemplary discardable FAT.

FIG. 13 is a flow chart of a method for managing a storage device using a primary FAT and a discardable FAT.

FIG. 14 is a flow chart of a method for managing a storage device using a FAT and a database.

FIG. 16 illustrates an exemplary FAT including a cluster chain in which an order of two or more clusters that comprise the cluster chain have been scrambled.

FIG. 17 illustrates an exemplary FAT and associated location files, where the FAT includes cluster chains in which an order of two or more of the clusters that comprise the cluster chains have been scrambled.

FIG. 20 illustrates exemplary bit masks user IDs in a file system.

FIG. 21 illustrates the client-side components of the Smart Cache.

FIG. 22 shows the file system structures for discardable files, as modified for Smart Cache HD.

FIG. 23 is a block diagram of a Large File Manager for use in the Smart Cache HD system.

DETAILED DESCRIPTION

Figure 1:
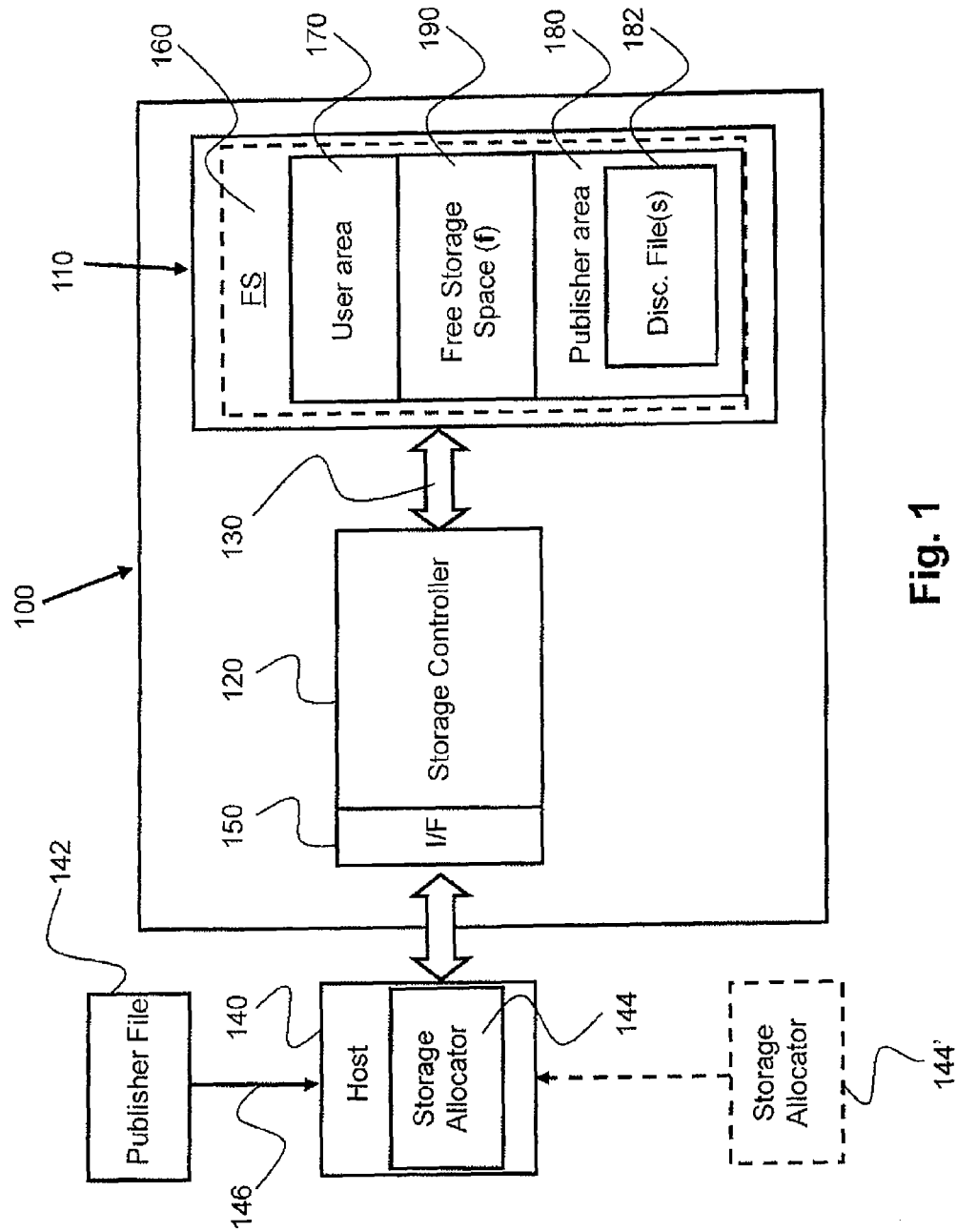
FIG. 1 is a block diagram of a storage system according to an example embodiment.

The description that follows provides various details of exemplary embodiments. However, this description is not intended to limit the scope of the claims but instead to explain various principles of the invention and the manner of practicing it.

In order to address unsolicited content and related issues, user files are given storage priority over other files, and a storage usage safety margin is maintained to guarantee that priority. A "user file" is a file that a user of a storage device has willingly stored, or has approved its storage in the storage device. For example, a music file that the user downloads to her/his storage device is regarded as a user file. Being requested or approved for storage by the user, user files are regarded as "solicited" files.

The "other files" are referred to herein as "publisher files" and "unsolicited files". A "publisher file" is a file stored in a storage device without the user requesting it or being aware of it; at least not for a while. The user may not want to use an unsolicited file. Unused unsolicited files tend to consume expensive storage space on the user's storage device. Therefore, according to the principles disclosed herein such files are permitted to be stored in the storage device only if storing them does not narrow the storage usage safety margin. Storage priority is rendered to user files by maintaining a free storage space (i.e., a storage usage safety margin) that will be reserved for future user's files. The storage usage safety margin has to be maintained in order to ensure that user files can be stored in the storage device whenever required or desired.

If for some reason the storage usage safety margin gets narrower than desired, one or more unsolicited files will be removed (i.e., deleted) from the storage device in order to restore the storage usage safety margin. Maintaining the storage usage safety margin guarantees storage space for additional user files if such files are downloaded to the storage device. To this end, unsolicited files are marked as "discardable" in a structure of the storage file system and, if required, removed later to reclaim at least the free storage space required to maintain the storage usage safety margin.

Because the likelihood of the user using the various discardable files may differ from one discardable file to another, each unsolicited file (i.e., each discardable file) is assigned in advance a discarding priority level according to one or more criteria such as the probability of using the file, the probable revenue associated with using the file, the file's size, the file's type, the file's location, the file's age, etc. For example, the discarding priority level may be determined by the potential for revenue. According to another example movie trailers or advertisements would have a higher discarding priority than the actual movie because users usually don't like seeing trailers and advertisements. According to another example, the one or more discardable files that are most likely to be used by the user will be assigned the lowest discarding priority level, which means that such files will be the last file(s) to be removed from the storage device. In other words, the higher the usage probability is of a discardable file the lower the level is of the discarding priority level assigned to that file. If the desired storage usage safety margin is not fully restored even though one or more discardable files were removed, additional discardable files will be removed from the storage device until the desired storage usage safety margin is restored.

Briefly, a data structure such as a file system implements a methodology for storing and organizing computer files. A file system includes a set of abstract data types and metadata that are implemented for the storage, hierarchical organization, manipulation, navigation, access, and retrieval of data. The abstract data types and metadata form "directory trees" through which the computer files (also referred to herein as "data files", or "files" for simplicity) can be accessed, manipulated and launched. A "directory tree" typically includes a root directory and optional subdirectories. A directory tree is stored in the file system as one or more "directory files". The set of metadata and directory files included in a file system is called herein a "file system structure". A file system, therefore, includes data files and a file system structure that facilitate accessing, manipulating, updating, deleting, and launching the data files.

File Allocation Table ("FAT") is an exemplary file system architecture. FAT file system is used with various operating systems including DR-DOS, OpenDOS, MS-DOS, Linux, Windows, etc. A FAT-structured file system uses a table that centralizes the information about which storage areas are free or allocated, and where each file is stored on the storage device. To limit the size of the table, storage space is allocated to files in groups of contiguous sectors called "clusters". As storage devices have evolved, the maximum number of clusters has increased and the number of bits that are used to identify a cluster has grown. The version of the FAT format is derived from the number of the table bits: FAT12 uses 12 bits; FAT 16 uses 16 bits, and FAT32 uses 32 bits.

Another file system architecture is known as New Technology File System ("NTFS"). Currently, NTFS is the standard file system of Windows NT, including its later versions Windows 2000, Windows XP, Windows Server 2003, Windows Server 2008, and Windows Vista. FAT32 and NTFS are exemplary file systems with which storage device 100 can be provided.

FIG. 1 shows a typical storage device 100. Storage device 100 includes a storage area 110 for storing various types of files (e.g., music files, video files, etc.), some of which may be user files and others may be publisher files. Storage device 100 also includes a storage controller 120 that manages storage area 110 via data and control lines 130. Storage controller 120 also communicates with a host device 140 via host interface 150. Host device 140 may be dedicated hardware or general purpose computing platform.

Storage area 110 may be, for example, of a NAND flash variety. Storage controller 120 controls all of the data transfers to/from storage area 110 and data transfers to/from host device 140 by controlling, for example, "read", "write" and "erase" operations, wear leveling, and so on, and by controlling communication with host 140. Storage area 110 may contain, for example, user files and publisher's files, protected data that is allowed to be used only by authorized host devices, and security data that is used only internally, by storage controller 120. Hosts (e.g., host 140) cannot directly access storage area 110. That is, if, for example, host 140 asks for, or needs, data from storage device 100, host 140 has to request it from storage controller 120. In order to facilitate easy access to data files that are stored in storage device 100, storage device 100 is provided with a file system 160.

Storage area 110 is functionally divided into three parts: user area 170, publisher area 180, and free storage space 190. User area 170 is a storage space within storage area 110 where user files are stored. Publisher area 180 is a storage space within storage area 110 where publisher files are stored. Free storage space 190 is an empty storage space within storage area 110. Free storage space 190 can be used to hold a user file or a publisher file. Upon storing a user file in free storage space 190, the storage space holding the user file is subtracted from free storage space 190 and added to user area 170. Likewise, upon storing a publisher file in free storage space 190, the storage space holding the publisher file is subtracted from free storage space 190 and added to publisher area 180. If a user file or a publisher file is removed (i.e., deleted) from storage area 110, the freed storage space is added (it returns) to free storage space 190.

If the size of free storage space 190 permits it, the user of storage device 100 can download a user file from host 140 to storage area 110. The downloaded user file will be stored in free storage space 190 and, as explained above, the storage space holding that file will be subtracted from free storage space 190 and added to user area 170. As explained above, user files have priority over other (e.g., publisher) files, and in order to guarantee that priority, a desired storage usage safety margin is set, and, if required, restored, in the way described below.

Host 140 includes a storage allocator 144 to facilitate restoration of free storage space 190. Storage allocator 144 may be hardware, firmware, software or any combination thereof. In general, storage allocator 144 determines whether a file (e.g., file 142) that is communicated to host 140 is either a user file or a publisher file, and then marks the communicated file accordingly (i.e., as a non-discardable file or as a discardable file).

If storage allocator 144 determines that a file (e.g., file 142) communicated to host 140 is non-discardable, for example because the file is a user file, storage allocator 144 stores the file in storage area 110 in a regular way. As explained above, the storage space within storage area 110 that holds the non-discardable file will be added to, or be part of, user area 170. If, however, storage allocator 144 determines that the file communicated to host 140 is discardable, for example because it is a publisher file, storage allocator 144 marks the file as discardable. It will be appreciated that in some implementations, to mark the file as discardable, storage allocator 144 marks the file system structure in the file system 160 to indicate that the file is a discardable file. In other implementations, to mark the file as discardable, storage allocator 144 marks the file itself as a discardable file. If free storage space 190 is larger than the desired storage usage safety margin storage allocator 144 also stores the marked discardable file in free storage space 190, and, as explained above, the storage space within free storage space 190 that holds the discardable file is subtracted from free storage space 190 (i.e., the free storage space is reduced) and added to publisher area 180 (the addition is logically shown as discardable file(s) 182).

As explained above, the likelihood that publisher files may be used by the user may vary from one publisher file to another, which makes a publisher file with the least usage likelihood the first candidate for removal form storage area 110. Therefore, in addition to marking a file as non-discardable or discardable storage allocator 144 assigns a discarding priority level to each discardable file prior, concurrently, or after the discardable file is stored in storage area 110.

By marking files as non-discardable or as discardable, assigning a discarding priority level by storage allocator 144, and by using the file system 160 (or an image thereof) of storage device 100, storage allocator 144 "knows" the number of user files and publisher files in storage area 110, and also their sizes and logical locations within storage area 110. Knowing this information (i.e., the number, sizes and locations of the files), and particularly based on one or more marked files, storage allocator 144 manages storage area 110 and the storage of solicited and unsolicited files in storage area 110. Managing storage area 110, or managing storage of files in storage area 110, may include, for example, restoring a storage usage safety margin by selectively removing one or more files marked as discardable, freeing a storage area by removing all files marked as discardable, and remapping clusters of a file to a lower-performance storage module. Managing storage area 110 or files stored therein may include managing other, additional, or alternative aspects of storage area 110 or files stored therein.

Storage allocator 144 also knows, by the discarding level assigned to each discardable file, the order at which discardable files can or should be discarded (i.e., deleted or removed from storage area 110) in order to restore the free storage space originally reserved for future user files (i.e., to restore the desired storage usage safety margin). Accordingly, if a user wants to store a new user file in storage area 110 but there is not enough free storage space to accommodate that user file (which means that the storage usage safety margin is narrow than desired), storage allocator 144 uses the discarding priority levels assigned to the discardable files to iteratively delete one discardable file after another to regain more free storage space (i.e., to extend free storage space 190) until the desired storage usage safety margin is fully restored. As explained above, a fully restored storage usage safety margin guarantees with high probability that an adequate free storage space is reserved for future user files. Discardable files are removed or deleted from storage device 100 only responsive to receiving a request to store a new user files because it is taken into account that the user may want to use a stored discardable file sometime and, therefore, the discardable file is removed from the storage device only if the storage space accommodating that file is required for the new user file. Storage allocator 144 may be embedded or incorporated into host 140, or it may reside externally to host 140 (shown as dashed box 144') and to storage device 100.

Storage allocator 144 has a representative image of the file system of, or associated with, storage device 100. Storage allocator 144 uses the storage device's file system image to mark files as non-discardable or as discardable, and to assign a discarding level to each discardable file. In one example, the file system includes the FAT and in this case the marking is done in an unused portion of a FAT entry associated with the file, by setting one or more unused bits. Because different file systems have different structures, marking files (i.e., as non-discardable or as discardable) and assigning discarding levels is adapted to the used file system structure, as elaborated in and described below in connection with FIGS. 6 through 1.

Figure 2:
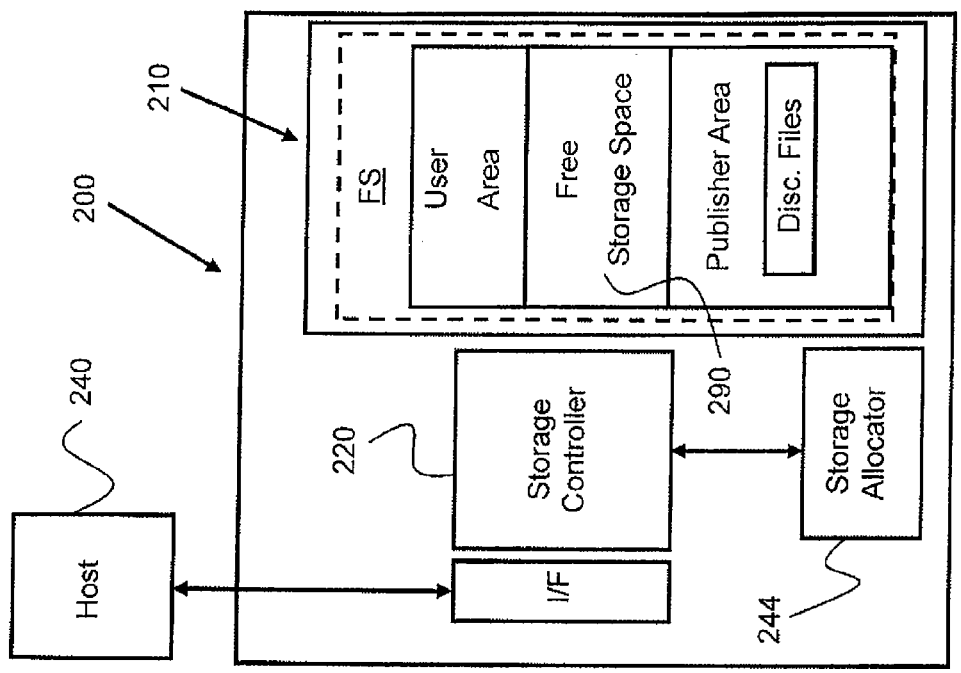
FIG. 2 is a block diagram of a storage system according to another example embodiment.

FIG. 2 is a block diagram of a portable storage device 200 according to another example embodiment. Storage controller 220 functions like storage controller 120 and storage allocator 244 functions like storage allocator 144. Storage allocator 244 may be hardware, firmware, software or any combination thereof. Storage allocator 244 internally cooperates with storage controller 220. Whenever storage controller 220 receives from host 240 a storage request to store a file in storage area 210, the request including an indication of whether or not the file is a discardable file, storage controller 220 informs storage allocator 244 of the storage request and whether or not the file is discardable. The storage allocator 244 then marks the file either as non-discardable or discardable in the structure of the file system associated with storage device 200. Typically, applications running on the host 240 determine that a file is a discardable file and send a flag or other indication to the storage controller 220 indicating that the file is a discardable file. The applications running on the host 240 send the flag or other indication as part of storage protocols for requesting to store a file on the storage device. Examples of such storage protocols include POSIX file system functions or the usage of the java.io class tree.

If storage allocator 244 determines that the new file is discardable storage allocator 244 assigns to the new file a discarding priority level according to the file's usage probability. Then, storage allocator 244 evaluates the current size of free storage space 290 and decides whether one or more discardable files should be removed (i.e., deleted) from storage area 210 in order to make room for the new file. If discardable file or files should be removed from the storage device storage allocator 244 decides which file(s) are the current candidate files for removal. Then, storage allocator 244 notifies storage controller 220 of the discardable files that should be removed from storage area 210 and, responsive to the notification, storage controller 220 removes the discardable file or files indicated by storage allocator 244. In some configurations of portable storage device 200, the storage allocator 244 may be functionally disposed between storage controller 220 and storage area 210. In configurations where storage allocator 244 is functionally disposed between storage controller 220 and storage area 210, storage allocator 244 or storage area 210 have to assume some of the functions of storage controller 220. In such configurations storage area 210 is comprised of memory units that communicate at a higher level than flash NAND protocols.

Figure 3:
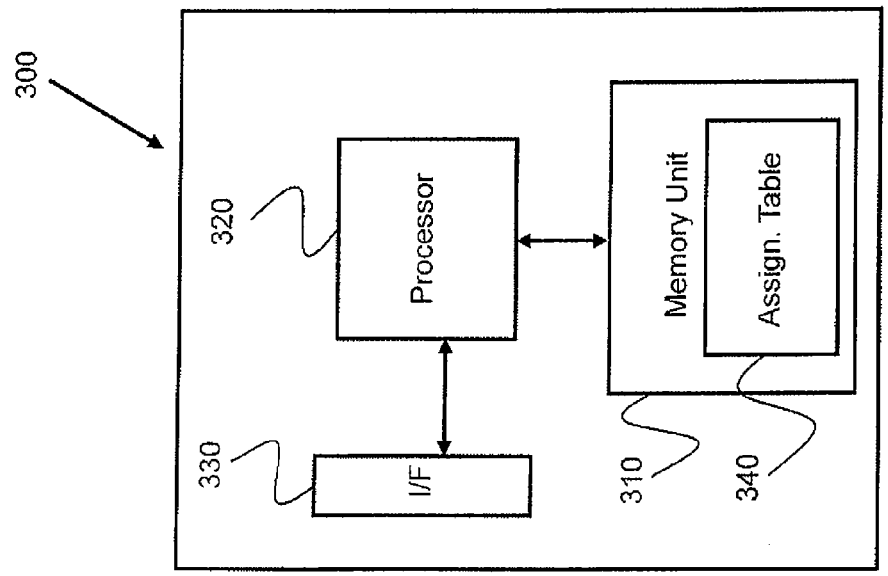
FIG. 3 is a block diagram of a storage allocator according to an example embodiment.

FIG. 3 is a block diagram of a storage allocator 300 according to an example embodiment. Storage allocator 300 includes a memory unit 310, a processor 320, and an interface 330. Memory unit 310 may hold a file system structure, or an image of the file system structure, that is associated with a storage device (e.g., storage device 200 of FIG. 2). Processor 320 manages the file system associated with the storage device. Interface 330 may be adapted to cooperate with a host and with a storage controller of a storage device, as demonstrated in FIG. 1, or only with a storage controller of a storage device, as demonstrated in FIG. 2.

Processor 320 is configured or adapted to receive a request via interface 330 to store a file in a storage area of the storage device, and to mark the file either as discardable or as non-discardable in a structure of the file system associated with the storage device with which storage allocator 300 operates. If interface 330 is functionally attached to storage controller 220 of FIG. 2 (and thus receives, for example, SCSI or wrapped USB/MSC commands rather than file level commands), the received request is at a level that is much lower than a file level. That is, the received request would be a request to store sectors at logical block addresses that, when properly interpreted by a host, would correspond to a file. If storage controller 220 supports the NVMHCI protocol, or a networking file system protocol such as NFS or a similar protocol, storage controller 220 can get file level requests. Therefore, the communication between a storage controller such as storage controller 220 and an interface such as interface 330 is not limited to NVMHCI or to NVMHCI-like implementations. Communication interface 330 may be an integral of storage allocator 300, as shown in FIG. 3.

Processor 320 is further configured or adapted to send the marked file to the storage device, marking the file as discardable includes assigning to the file a discarding priority level. If the file system used by the storage device is FAT-based, processor 320 assigns the discarding priority level to the marked file by setting a corresponding value to m uppermost (i.e., most significant) bits (e.g., m=4) in a FAT corresponding to the marked file. The corresponding value set to the most significant bits in the FAT entry, or the value set to the NTFS directory entry, may be, or it may be, related to an attribute of the file. By "attribute" is meant a metadata tag or some data structure in the header of the FAT table or NTFS table that contains information that pertains to the type of the content stored within the table. "Advertisement", "premium content", and "promotional (free) content" are exemplary types of contents that may be stored in the FAT table or in the NTFS table. Alternative criteria for setting discarding levels are, for example, the last accessed files, file sizes, file types, etc.

The number m of the uppermost bits of FAT32 entries dedicated for marking files may be four or less than four because those bits are not used. In addition, the more bits are used the more discarding priority levels can be used. For example, using three bits (i.e., m=3) provides eight ($2^3$=8) discarding priority levels and using four bits (i.e., m=4) provides sixteen ($2^4$=16) discarding priority levels (i.e., including discarding priority level "0", which is assigned to non-discardable files). In other words, processor 320 sets the value of the m uppermost bits to 0 if the marked file is non-discardable or to a value between 1 and $2^m-1$ if the marked file is discardable. The discarding priority level indicates the priority at which the marked file can or should be discarded from the storage device. For example, depending on the implementation, the value "1" may denote a file that is either discardable with the lowest priority or with the highest priority, and the value "$2^m-1$" may respectively denote a file that is either discardable with the highest priority or with the lowest priority.

Processor 320 may assign the discarding priority levels to marked files according to an anticipated usage of the files, as explained above in connection with the likelihood or probability that an unsolicited file is going to be used by the user of the storage device. Processor 320 may update the discarding priority level of the marked file with, or responsive to receiving, each request to store a new file in the storage device. Processor 320 may update the discarding priority level of a given marked file independently from one or more new requests to store a file in the storage device. For example, a file that was previously of a high priority may have its priority lowered after a certain time interval. Processor 320 deletes a file that is stored in the storage device if the file has associated with it a discarding priority level that equals or is greater than a predetermined discarding threshold value. Processor 320 may (re)set the discarding threshold value based on the number of file writes or additions, or depending on the anticipated use of free storage space on the storage device or availability of new publisher files.

Memory unit 310 may hold an assignment table 340 that contains discarding priority levels that processor 320 assigns to files stored in the storage device. In addition, assignment table 340 may hold files' identifiers and information that associates files with the discarding priority levels assigned to the files. Assignment table 340 may additionally hold a discarding threshold value. The information held in assignment table 340 allows processor 320 to identify which discardable file or files can be removed from the storage device in order to restore the desired storage usage safety margin.

Responsive to receiving a request to store a new file in the storage device processor 320 evaluates the size of a free storage space (f) on the storage device and stores the new file in the storage device if the evaluated size of the free storage space on the storage device is larger than a predetermined size or, if it is not larger than the predetermined size, processor 320 searches for one or more discardable files within the storage device that can be deleted and, upon finding such file or files, processor 320 deletes that file or files to extend the current free storage space (f) such that the total size of the extended free storage space equals or is larger than the predetermined size. The discardable file or files can be deleted from the storage device if the discarding priority level associated with the discardable files equals or is greater than a predetermined discarding threshold value (for example between 1 and 15 inclusive, for example 15).

After the free storage space is extended enough processor 320 permits the new file to be stored in the extended free storage space. By "free storage space is extended enough" is meant expanding the free storage space by freeing one occupied storage space after another until the total free storage space can accommodate the new file without narrowing the desired storage usage safety margin mentioned above or, equivalently, until the total size of the extended free storage space equals or is greater than a predetermined size or until all discardable files are removed.

Processor 320 can be a standard off-the-shelf System-on-Chip ("SoC") device or a System-in-Package ("SiP") device or general purpose processing unit with specialized software that, when executed, performs the steps, operations and evaluations described herein. Alternatively, processor 320 can be an Application-Specific Integrated Circuit ("ASIC") that implements the steps, operations and evaluations described herein by using hardware.

FIG. 4 is a method for storing discardable files according to one example embodiment. FIG. 4 will be described in association with FIG. 1. At step 410 host 140 receives a request to store file 142 in storage device 100. At step 420 storage allocator 144 marks the file as "discardable" or as "non-discardable" and sends, at step 430, the marked file to storage controller 120 of storage device 100 (i.e., for storage in storage area 110) if free storage space 190 is sufficiently large. A file is marked also in the sense that a discarding priority level is assigned to the file. At step 440 storage allocator 144 manages storage area 110 (through communication with storage controller 120) or files that are stored in storage area 110 based on the marked file and, optionally, based on one or more files that have already been marked.

FIG. 5 is a method for managing the storage of discardable files in a storage device according to one example embodiment. FIG. 5 will be described in association with FIG. 1. A new file is candidate for storage in storage device 100. Knowing the current image of file system 160 of storage device 100, storage allocator 144 evaluates, at step 510, the current size "f" of free storage space 190 to see whether free storage space 190, whose current size is f, can accommodate the new file (i.e., the file that is candidate for storage). In general, the way storage allocator 144 handles the new file depends on whether the new file is a user file or a publisher file. Therefore, storage allocator 144 determines first whether the new file is a user file or a publisher file.

The New File is a User File

At step 520 storage allocator 144 checks whether free storage space 190 can accommodate the new user file. If free storage space 190 can accommodate the new user file (shown as "Y" at step 520), storage allocator 144 stores, at step 560, the new user file in free storage space 190 regardless of whether the desired storage usage safety margin is narrowed by storing the new user file or not. If the desired storage usage safety margin gets narrower (i.e., relative to the desired storage usage safety margin) after storage allocator 144 stores the new user file in free storage space 190, storage allocator 144 takes no further actions with respect to the storage of the new user file.

If, however, the desired storage usage safety margin gets narrower after storage allocator 144 stores the new user file in free storage space 190, step 550 includes an additional step where storage allocator 144 determines which stored discardable file should be deleted first, which discardable file should be deleted second, and so on, in order to maintain the desired storage usage safety margin. Storage allocator 144 determines which discardable file should be deleted first, which should be deleted second, etc. based on discarding levels that storage allocator 144 assigned to the stored discardable files.

If storage allocator 144 determines at step 520 that free storage space 190 cannot accommodate the new user file (shown as "N" at step 520), storage allocator 144 determines, at step 530, whether free storage space 190 and the storage space consumed by discardable files, when combined, is sufficient for storing the new user file. If the combined storage space is insufficient (shown as "N" at step 530), this means that no matter how many discardable will be deleted the new user file cannot be stored in the "non-user" storage area due to its larger size. If the combined storage space is sufficient (shown as "Y" at step 530), storage allocator 144 searches, at step 540, among stored discardable files which discardable file can be deleted in order to free sufficient storage space for the new user file. Storage allocator 144 searches for these discardable files by using the file system of storage device 100 because, as explained above, storage allocator 144 marks files as non-discardable or as discardable in the file system of the storage device. In addition, the discarding levels assigned by storage allocator 144 to marked files are also embedded into the storage device's file system such that each discarding level is associated with the corresponding marked file.

Upon finding a discardable file ("DF") that should be discarded first (that file is called hereinafter "DF1"), storage allocator 144 deletes file DF1 in order to add, or to return, its storage space (that storage space is called hereinafter "SP1") to storage space 190.

Then, at step 550 storage allocator 144 checks whether the extended free storage space 190 (i.e., free storage space 190 plus the last returned storage space, or f+SP1) can accommodate the new user file. If the extended free storage space 190 (i.e., f+SP1) still cannot accommodate the new user file (shown as "N" at step 550) storage allocator 144 iteratively repeats step 550 (the iterations are shown at 555) in order to return an additional storage space to free storage space 190 (i.e., by finding and deleting the next discardable file that should be deleted).

Upon finding the next discardable file with the second highest discarding priority (the next discardable file is called hereinafter "DF2"), storage allocator 144 deletes file DF2 in order to free and add additional storage space (the additional storage space is called hereinafter "SP2") to free storage space 190. Then, at step 550 storage allocator 144 checks again whether the extended free storage space 190 (i.e., free storage space 190 plus the two last freed storage spaces, or f+SP1+SP2) can accommodate the new file. If the extended free storage space 190 (i.e., f+SP1+SP2) still cannot accommodate the new file (shown as "N" at step 540), storage allocator 144 repeats step 540 one more time in order to find the next discardable file that should be deleted. Storage allocator 144 iterates steps 540 and 550 until the accumulated free storage space 190 can accommodate the new user file (shown as "Y" at step 550). Then, at step 560 storage allocator 144 stores the new user file in storage area 110.

As said above, if the actual storage usage safety margin gets narrower than the desired storage usage safety margin after storage allocator 144 stores the new user file in free storage space 190, step 560 may include an additional step in which storage allocator 144 determines which stored discardable file should be deleted first, which discardable file should be deleted second, etc., in order to restore the desired storage usage safety margin.

The New File is a Publisher File

If the new file is a publisher file, storage allocator 144 stores (at step 560) the new publisher file in storage area 110 only if free storage space 190 can accommodate the new publisher file without narrowing the desired storage usage safety margin. That is, if storing the new publisher file would result in narrowing the desired storage usage safety margin storage allocator 144 may decide not to store the new publisher file in storage area 110. In such a case, storage allocator 144 may refrain from taking any action with respect to that file, and delete no file from the storage device to free storage space for the new publisher file. Alternatively, storage allocator 144 may delete at step 540 one or more higher priority discardable files in order to free storage space for a discardable file that has a lower discarding priority. As stated above, files are marked in, and discarding levels are embedded into, the file system of storage device 100, and the way the files are marked and the discarding levels embedded into the file system depends on, or can be adapted to, the used file system.

FIG. 6 is a method for marking an unsolicited file in a FAT32-structured file system according to one example embodiment. FAT32-structured file systems use clusters. As described above in connection with FAT32-structured file systems, the number of bits that are used to identify a FAT32 cluster is 32. FIG. 6 will be described in association with FIG. 1.

At step 610 m uppermost bits of the 32 bits (where m≥4) of each cluster of the FAT32 are allocated or dedicated for marking files as non-discardable or as discardable, as the case may be, and also for holding a corresponding discarding level for each discardable file. Assigning the discarding level to a file is done by setting a corresponding value to the allocated m bits corresponding to the marked file.

At step 620 storage allocator 144 evaluates the level of likelihood at which the user of storage device 100 will use the unsolicited file. Evaluation of the likelihood of using the file can be implemented in various ways that are known to those skilled in the art of consignment files. For example, the evaluation of the likelihood of using the file may be based on monitoring the location of the person using the storage device, and/or on monitored user's previous experience and preferences. Evaluation of the likelihood of using the file may also be based, for example, on the type of content stored within the FAT table or NTFS table (e.g., "advertisement content", "premium content", "promotional (free) content", etc.). Storage allocator 144 may use alternative or additional criteria to evaluate the likelihood at which the file will be used. For example it may use attributes or characteristics of file(s), which may be, or be associated with, the last accessed file(s), file sizes, file types, etc.

After storage allocator 144 evaluates the level of likelihood at which the user will use the unsolicited file storage allocator 144 assigns, at step 630, a discarding priority level corresponding to the evaluated likelihood level of usage of the unsolicited file. The more likely the unsolicited file is going to be used by the user of storage device 100 the lower is the discarding level.

If m equals four bits, this means that the discarding scale provides 15 discarding levels from 1 (i.e., 0001) to 15 (i.e., 1111). That is, discarding level 0 will be assigned to every non-discardable file, discarding level 1 will be assigned to a discardable file with the lowest discarding priority, and discarding level 15 will be assigned to a discardable file with the highest discarding priority. After storage allocator 144 assigns a corresponding discarding level to the unsolicited file, storage allocator 144 sets, at step 640, a corresponding value between 1 and 15 to the four uppermost bits of the clusters associated with the unsolicited file. If the unsolicited file has associated it two or more clusters, the four uppermost bits in each cluster is set to the same value.

At step 650 it is checked whether the unsolicited file is the last file that needs to be evaluated. If the unsolicited file is not the last file that needs to be evaluated (shown as "N" at step 650) another file is evaluated in the way described above. If the unsolicited file is the last file that needs to be evaluated (shown as "Y" at step 650) the unsolicited file(s) is (are) sent to storage device with the m bits for each whose value was set at step 640.

FIG. 7 is an exemplary directory table 700 associated with a FAT32 table. Directory table 700 is only a partial table used for illustration and as such, table 700 does not show all the fields of a FAT directory entry. Directory area 700 holds particulars of files that are stored in a related file system, such as the files names, files size, and where in a related storage space each file begins. The particulars of the files are held in the following fields. Field 710 holds the Disk Operating System ("DOS") filenames of the files stored in the related file system, field 720 holds the extension of the files, field 730 holds various attributed of the files, field 740 holds the high 16-bitword of the First Cluster Number ("FCN") of the files, field 750 holds the low part of the First Cluster Number ("FCN") of the files, and field 760 holds the size of the files. Each FCN number indicates the first logical cluster where a file may be found.

The first entry of directory area 700 holds information for an exemplary file called "REALFILE" (shown at 770). REALFILE 770 has a file extension "DAT", its FCN is "0000 0002" (shown at 755), and its size is "0000 24E4". Numbers in table 700 are shown in hexadecimal values. As part of the standard, attribute values "00" (shown at 780) and "20" (not shown in FIG. 7) refer to a "regular" file, whereas attribute value "02" refers to a file that is hidden in the file system. Filename "\xE5Consign" indicates a deleted file, where "\xE5" means that the value of the first byte of the filename is E5 in hex. By way of example, FCN number 0000 0002 (shown at 755) designates the first cluster of file REALFILE.

FIG. 8 is an exemplary partial FAT32 table 800 according to an example embodiment. FAT32 table 800 is shown as a double-word ("DWORD") array, and the values are hexadecimal values. Reference numeral 810 designates the type of device holding FAT32 table 800, where "F8" refers to a hard drive. FAT32 table 800 includes 23 clusters that are designated as cluster #1 (shown at 820), cluster #2 (shown at 825), . . . , and cluster #23 (shown at 830). FIG. 8 will be described in association with FIG. 7. A cluster in FAT32 table 800 may be the first cluster of a file, or it may point to the next linked cluster of the file, or it may be an End-of-File ("EOF") indication.

Referring again to directory area 700, the first FCN of file REALFILE (shown at 770) is "0000 0002" (shown at 755), which points at cluster #2 in table 800 of FIG. 8. As shown in FIG. 8 the value of cluster #2 (i.e., the value "000 0003") points (shown at 840) at cluster #3, which is the next file's cluster. Likewise, the value of cluster #3 (i.e., "0000 0004") points at cluster #4, which is the next file's cluster. Cluster #4 has the value "0FFF FFFF" ("F" is the hexadecimal digit that represents the decimal value "15"), where "FFF FFFF" (shown at 850) denotes the file's EOF indication, and the zero value (shown at 860) denotes discarding level 0. File REALFILE, therefore, has associated with it three clusters (i.e., cluster #2, cluster #3, and cluster #4).

As explained above, a discarding level 0 is assigned to non-discardable files. It is noted that the most significant hexadecimal digit of each cluster of a particular file is set to the same discarding priority level that is assigned to that file. For example, file REALFILE has been assigned a discarding level "0" and, therefore, each of the most significant hexadecimal digits of clusters #2, #3, and #4 has that value (i.e., value "0", the "0" values are underlined). According to another example, the file "E5 Consign" whose FCN is "0000 0005" (as shown in FIG. 7) has been assigned a discarding priority level "1". Therefore, the most significant hexadecimal digit of each of clusters #5 through 12, which pertain to that file, has the value "1" (for example as shown at 870). In other words, according to the present disclosure the most significant hexadecimal digit (or, equivalently, the four uppermost bits of the clusters associated with a particular discardable file are set to the same value corresponding to the discarding priority level assigned to the particular file. As explained above the number m of the uppermost bits used for indicating the discarding priority level may differ from four (i.e., m≤4).

Figure 9:
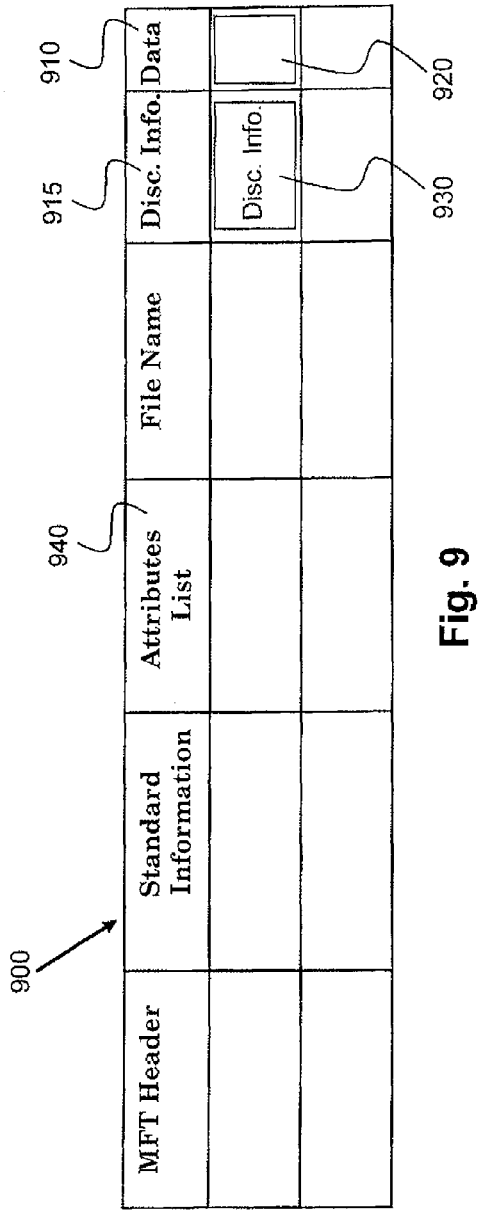
FIG. 9 is an NTFS table according to an example embodiment.

FIG. 9 is an exemplary partial NTFS table 900 according to an example embodiment. NTFS table 900 holds particulars of files such as the file names, the file sizes, etc. NTFS table 900 includes a data field 910 to hold "regular" data (e.g., data 920) for files that change according to "normal" data flow. According to the present disclosure, NTFS table 900 also includes a "Discarding Information" field 915 for holding, discarding information (e.g., discarding information 930) for each evaluated file. Discarding information field 915 may also include information other than the discarding priority level. For example, discarding information field 915 may include information pertaining to the server that supplied the file and an expiration time after which the file must be discarded. Unlike FAT-based file systems, in NTFS-based file systems the discarding values assigned to discardable files are not limited to a maximum number that is dictated by a set of bits. This means that the range of discarding values can be chosen liberally. For example, discarding values can range from 1 to 25. NTFS is an exemplary non-FAT file system. In general, corresponding discarding values may be set to a data field in a non-FAT based file system entries corresponding to marked files.

Figure 10:
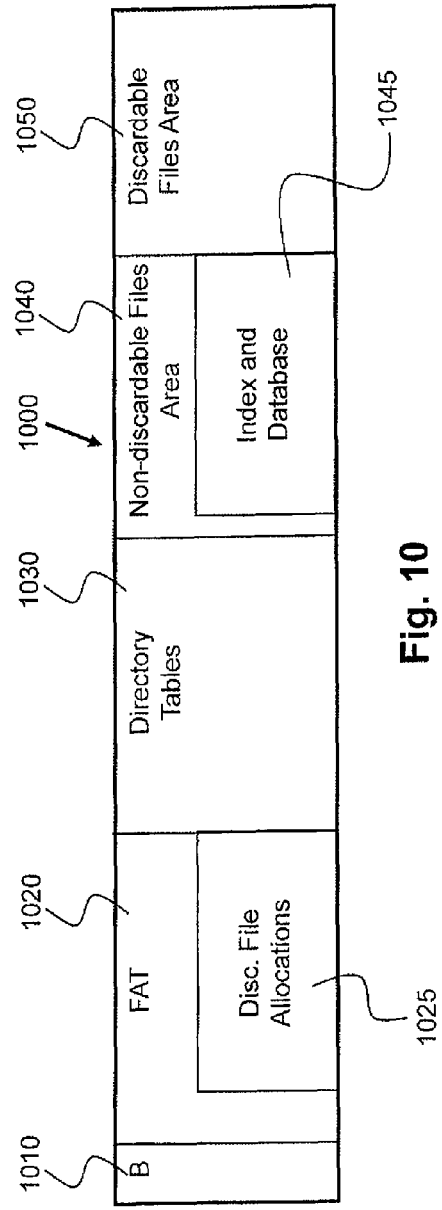
FIG. 10 is a logical image of a FAT-based file system according to example embodiments.

FIG. 10 is a logical arrangement of file system 1000 of a storage device according to an example embodiment. A storage allocator (e.g., storage allocator 144 of FIG. 1) may either hold file system 1000 of the storage device with which it operates or an image of file system 1000, or the storage allocator may have an access to file system 1000.

File system 1000 includes a boot section 1010, a FAT 1020 associated with file system 1000, directory tables 1030, a files area 1040, and a discardable files area 1050. FAT 1020 includes a discardable files allocations area 1025 that contains the discarding priority levels of discardable files. Directory tables 1030 include access information for accessing whatever files (i.e., discardable files and/or non-discardable files) are stored in the storage device. Files area 1040 contains the non-discardable files. Index and database area 1045 holds indexes for the discardable files and also metadata that is related to the discardable files. The indexes and metadata held in Index and database area 1045 are used to calculate the discarding levels but they are not required during the actual discarding process. Discardable files area 1050 holds the discardable files.

FIG. 11 demonstrates the files management method according to the present disclosure. FIG. 11 will be described in association with FIG. 1. It is assumed that at time T0 two user files (i.e., files "F1" and "F2") are initially stored in storage area 110. Because files "F1" and "F2" are user files they are stored in user area 170 and the discarding level assigned to them by storage allocator 144 is zero. Because the total storage capacity of storage area 110 is T (shown at 1110) and files F1 and F2 are stored in storage device 100, the size of the remaining free storage space 190 (see FIG. 1) is f (shown at 1120). It is assumed that a publisher wants to store three unsolicited files in storage area 110. As described above, storage allocator 144 evaluates the size of free storage space 190 (or fat 1120) in storage device 100 in order to determine whether storing the publisher's three unsolicited files in storage area 110 will not narrow a desired storage usage safety margin (shown at 1130) that is reserved for future user's files. If storing publisher's three unsolicited files would narrow storage usage safety margin 1130 (i.e., the desired storage usage safety margin) storage allocator 144 will refrain from storing these files.

In this example, storage allocator 144 determines that the publisher's three unsolicited files can be stored in storage area 110 without reducing storage usage safety margin 1130. Therefore, at time T1 storage allocator 144 permits storage controller 120 to store the publisher's three unsolicited files in storage area 110. The three publisher's unsolicited files are designated as "P1", "P2", and "P3". Storage allocator 144 also determines the probability that files P1, P2, and P3 will be used by the user of storage device 100 and assigns a corresponding discarding level to each of these file. Storage allocator 144 then stores the discarding levels assigned to the files in the FAT table, as demonstrated in FIG. 8, or in the NTFS table, as demonstrated in FIG. 9.

At time T2 the user of storage device 100 wants to store in storage area 110 two more files (i.e., files "F3" and "F4"). Storage allocator 144 reevaluates the size of free storage space 190 (or f at 1120) in storage device 100 in order to determine whether there is sufficient storage space in storage area 110 to store the additional files (i.e., files F3 and F4). In this example storage allocator 144 determines that the currently free storage space can accommodate files F3 and F4. Therefore, at time T2 storage allocator 144 permits storage controller 120 to store files F3 and F4 in storage area 110.

Because files F3 and F4 are user files the probability that files F3 and F4 will be used by the user of storage device 100 is irrelevant because user files have storage priority over publisher files regardless of how many times, if at all, the user is going to use files F3 and F4. Accordingly, storage allocator 144 assigns a discarding level "0" to files F3 and F4 and stores the assigned discarding level in the FAT table, as demonstrated in FIG. 8, or in the NTFS table, as demonstrated in FIG. 9.

At time T3 the user of storage device 100 wants to store in storage area 110 another file (i.e., file "F5"). Storage allocator 144 reevaluates the size of free storage space 190 (or fat 1120) in storage device 100 in order to determine whether there is sufficient storage space in storage area 110 to store the additional file (i.e., file F5).

In this example, storage allocator 144 determines that the currently free storage space can accommodate file F5. Therefore, at time T3 storage allocator 144 permits storage controller 120 to store file F5 in storage area 110. As shown in FIG. 11, storing user file F5 narrows the storage usage safety margin. That is, the free storage space fin storage area 110 that remains after files F1 through F5 and P1 through P3 are stored in storage area 110 is smaller than storage usage safety margin 1130. Therefore, storage allocator 144 reinstates or restores the storage usage safety margin by removing one of the publisher's files (i.e., P1, P2, and P3). A storage usage safety margin is reinstated or restored by removing (i.e., deleting) one or more publisher files because, as explained above, user files have ultimate storage priority.

As described above, the decision which publisher file or publisher files should be removed from the storage area 110 is made by storage allocator 144 based on the discarding priority level that storage allocator 144 assigned to each stored discardable file.

Turning back to FIG. 11, it is assumed that among the stored publisher files P1 through P3 publisher file P3 was assigned the highest discarding priority level (e.g., 13).

Therefore, at time T4 file P3 is removed from storage area 110, thus enlarging the free storage space 190. Because the size of free storage space 190 (or fat 1120) at time T4 is larger than storage usage safety margin 1130, there is no need to remove any more publisher files.

The user of storage device 100 may want to remove one or more user files. At time T5 the user removed two of his files (i.e., files F4 and F5), thus further enlarging free storage space 190. The removal of files F4 and F5 has nothing to do with the size of free storage space 190 or the storage usage safety margin because, as stated herein, regaining free storage space or restoring the storage usage safety margin is done by removing as many discardable files as necessary. It is assumed that a publisher wants to store another unsolicited file in storage area 110. As described above, storage allocator 144 evaluates the size of free storage space 190 (or f at 1120) in order to determine whether storing the publisher's unsolicited file in storage area 110 will not narrow storage usage safety margin 1130. If storing the publisher's the new unsolicited file will narrow storage usage safety margin 1130 storage allocator 144 will refrain from storing that file.

In this example storage allocator 144 determines that the publisher's new unsolicited file (i.e., file "P4") can be stored in storage area 110 without reducing storage usage safety margin 1130. Therefore, at time T6 storage allocator 144 permits storage controller 120 to store the publisher's file P4 in storage area 110. Storage allocator 144 also determines the probability that file P4 will be used by the user of storage device 100 and assigns a corresponding discarding level to this file. Storage allocator 144 then stores the discarding level assigned to file P4 in the FAT table, as demonstrated in FIG. 8, or in the NTFS table, as demonstrated in FIG. 9. The process of storing new publisher's files and new user files and removing stored files may continue while each time a new file is to be added to storage area 110 storage allocator 144 evaluates the current size of free storage space 190 and determines which publisher file or files (if at all) has/have to be removed from storage area 110.

Assigning a discarding level to a discardable file may be based on user experience or preferences, on Global Positioning System ("GPS") location of the user, and/or on other criteria. For example, if the user of the storage device seems (based on previous user experience) to like certain types of music, the storage allocator may assign a relatively low discarding priority level (e.g., 3 in a scale of 1 to 15) to a publisher's file if that file contains music that is one of the user's favorite types of music. However, if the publisher's music is disliked by the user (i.e., based on previous user experience), the storage allocator may assign to the related publisher's file a higher discarding priority level (e.g., 12 in a scale of 1 to 15). The criteria used to assign a discarding level to a discardable file may include anticipated usage of the file, anticipated revenue associated with using the file, the file's type, the file's size, the file's location in the storage device, the file's age, and other criteria or parameter as specified herein. Other criteria, whether alone or in combination with any of the criteria mentioned herein, may likewise be used, and the assignment of discarding levels may be done using one or more criterions. In addition, different criteria may be used to assign a discarding level to different discardable files.

In another example, if a publisher wants to send to a user a location-dependent advertisement (i.e., an advertisement relating to a product or service rendered within a specific locality), the storage allocator may assign a discarding priority level to the publisher's advertisement that changes according to the user's changing location. That is, the farther the user gets from a particular location, the higher the discarding level would be, because by getting away from the specific locality it can be assumed that the user is not interested in consuming the product or service rendered at the specific locality.

As described above, cluster chains for discardable files are recorded in a FAT with a flag identifying a file associated with a FAT32 entry as a discardable file. Typically, the flag is in the four most significant bits of each FAT32 entry. Because cluster chains may be allocated to a discardable file but do not have a non-discardable file associated with them, it is possible that a utility such as chkdsk or fsck.vfat will turn a discardable files into non-discardable files, also known as "real" files, thereby reducing the security of the file system 160. Additionally, there is a risk that some FAT recovery utilities will reset the discardable-file flags in the FAT32 entries. FAT32 file system checking and repair utilities often step through a file system and apply rules in order to fix common errors. Generally, these utilities may look for cluster chains in a FAT that have no corresponding entry in the First Cluster Number (FCN) column within the directory tables. The utilities treat cluster allocations in the FAT that do not have any directory or file entries as unaccounted data fragments (also known as orphan clusters) and the utilities may delete these orphan clusters or create a corresponding file entry in a directory table. Because the discardable file system described herein may make use of what would otherwise be considered an orphan cluster, the utilities may improperly turn a discardable file into a non-discardable file or remove the discardable file entirely.

To address these problems, in some implementations, the storage allocator 144 may associate a discardable file with a cluster chain in a primary FAT, where the cluster chain hides a physical location of the discardable file, and the storage allocator 144 stores the physical location of the file in a discardable FAT, a database, or one or more location files. Typically, the discardable FAT, database, or one or more location files are not visible to the primary FAT, and in some implementations, an attribute associated with the discardable FAT, database, or one or more location files may be enabled that prevents a host operating system from accessing the discardable FAT, database, or one or more location files.

As noted before, each entry in a FAT32 is 32 bits, but only the lower 28 bits are used. Typically, the upper four bits are reserved and are set to zero. (Compliant implementations of FAT32 are required to ignore the upper four bits if set on allocated clusters, and to set the upper four bits to zero when writing new FAT entries.) Discardable files are distinguished from non-discardable files by a flag within the upper four bits of the FAT entries of each cluster chain that is associated with the file. Standard FAT32 drivers will see discardable files as allocated space and will not write over them. However, a storage allocator 144 may periodically perform operations, such as those described above with respect to FIG. 5, in order to maintain free space allocations in the storage device 110 and may recover the space allocated to discardable files.

By utilizing a primary FAT and at least one of a discardable FAT, a database, and one or more location files, the primary FAT may be extended. When the extended primary FAT is used in conjunction with a branch in file allocation table lookup logic, such that if the upper four bits of a FAT entry are nonzero, information in the discardable FAT, database, or one or more location files reflecting a physical location of the discardable file is used in place of the FAT entry in the primary FAT. Due to the information in the discardable FAT, database, or one or more location files overriding a value in the FAT entry of the primary FAT, utilities such as chkdsk and fsck.vfat will not turn discardable files into non-discardable files because the utilities will see the clusters of the discardable file as associated with directory or file entries in the discardable FAT, database or one or more location files. Also, FAT recovery utilities will not reset the flags in FAT32 entries indicating that a file is a discardable file because utilities such as chkdsk and fsck.vfat see the clusters associated with the discardable files as associated with directory or file entries in the discardable FAT, database, or one or more location files rather than as free space.

When the file system 160 utilizes a primary FAT 1200 and a discardable FAT 1201, to store a file that has been marked as a discardable file, the storage allocator 144 updates the primary FAT 1200 as shown in FIG. 12a to associate a cluster chain 1202 allocated to a discardable file with the file. Generally, the cluster chain 1202 may be the same size as, or larger than, the discardable file associated with the cluster chain 1202. In some implementations, the cluster chain 1202 masks a physical location of the discardable file in the primary FAT. Typically, as described above with respect to FIGS. 7 and 8, each cluster in the cluster chain starting in entry 1204 points to the next sequential cluster of the cluster chain 1202 until a value such as 1FFF FFFF, as shown in entry 1206, indicates an end to the cluster chain 1202. However, in other implementations, each cluster of the cluster chain may have a value such as 1FFF FFFF indicating that the cluster is an individually allocated cluster rather than pointing to a next sequential cluster of a cluster chain.

The first entry 1204 of the cluster chain 1202 points to a corresponding entry 1208 in the discardable FAT 1201, as shown in FIG. 12b. As described above with respect to FIGS. 7 and 8, for each file, each cluster in the cluster chain 1202 within the discardable FAT 1201 points to a next sequential cluster of the file until a value such as 1FFF FFFF, as shown in entry 1210, indicates the file's EOF.

It should be appreciated that one cluster chain 1202 may be associated with more than one file. For example, as shown in FIG. 12b, cluster chain 1202 includes a first set of clusters from cluster #6 (element 1208) to cluster #9 (element 1210) for a first file 1212 and includes a second set of cluster from cluster #10 to cluster #11 for a second file 1214.

Additionally, it should be appreciated that a primary FAT 1200 and corresponding discardable FAT 1201 may include more than one cluster chain. For example, as shown in FIGS. 12a and 12b, a primary FAT may include the cluster chain 1202 of cluster #6 to cluster #11 and may include a second cluster chain 1216 of cluster #20 to cluster #22.

In other implementations, rather than using a primary FAT 1200 and a discardable FAT 1201, a file system may utilize a primary FAT 1200 to associate one or more files with a cluster chain, as described above, and a database or one or more separate location files in place of the discardable FAT to store physical locations of the one or more discardable files associated with the cluster chain. The database or location files may be text files or binary files that are stored in the non-discardable area of the file system.

FIG. 13 is a method for managing a storage device using a primary FAT and a discardable FAT. FIG. 13 will be described in association with FIG. 1. At step 1310, host 140 receives a request to store file 142 in storage device 100. In some implementations, the storage allocator 144 derives the request to store file 142 in the storage device 100 based on one or more write requests associated with the file.

At step 1320, the storage allocator 144 marks the file as "discardable" or as "non-discardable" in a file system structure associated with the storage device 100 as described above. At step 1320, the file is marked also in the sense that a discarding priority level is assigned to the file.

At step 1330, when the file is a discardable file, the storage allocator 144 updates a primary FAT to associate a cluster chain that is allocated to the file with the file. At step 1340, the storage allocator 144 updates a discardable FAT to reflect a physical location of the file in the storage device 100. At step 1350, the storage allocator 144 manages the storage area 110 of the storage device 100 (through communication with the storage controller 120) or manages files that are stored in the storage area 110 based on the marked file and in accordance with the discardable FAT. The management of the storage area is similar to that described above with respect to FIG. 5.

FIG. 14 is a method for managing a storage device using a FAT and a database. FIG. 14 will be described in association with FIG. 1. At step 1410, host 140 receives a request to store file 142 in storage device 100. At step 1420, the storage allocator 144 marks the file as "discardable" or as "non-discardable" in a file system structure associated with the storage device 100 as described above. At step 1420, the file is marked also in the sense that a discarding priority level is assigned to the file.

At step 1430, when the file is a discardable file, the storage allocator 144 updates a FAT to associate a cluster chain that is allocated to the file with the file. At step 1440, the storage allocator 144 updates a database to reflect a physical location of the file in the storage device 100. At step 1450, the storage allocator 144 manages the storage area 110 of the storage device 100 (through communication with the storage controller 120) or manages files that are stored in the storage area 110 based on the FAT and the database.

Figure 15:
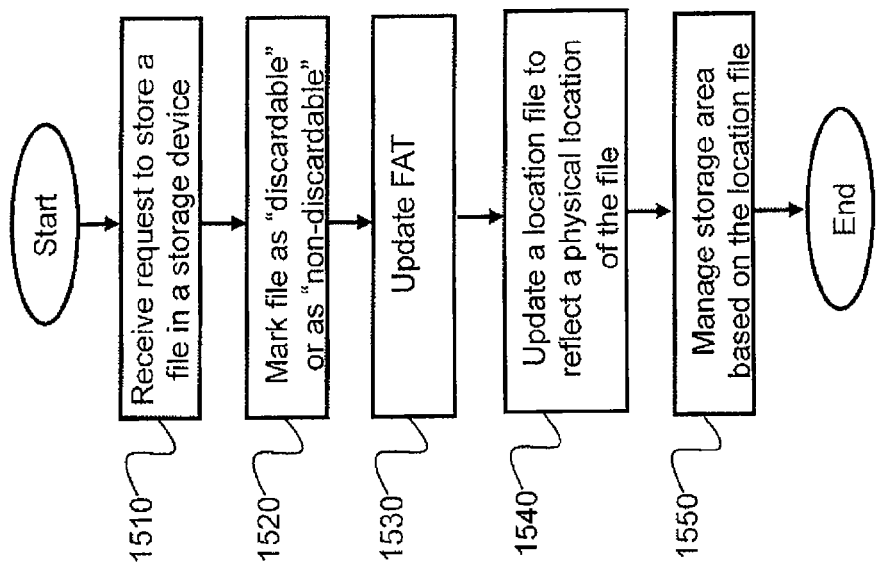
FIG. 15 is a flow chart of a method for managing a storage device using a FAT and a location file.

FIG. 15 is a method for managing a storage device using a FAT and a location file. FIG. 15 will be described in association with FIG. 1. At step 1510, host 140 receives a request to store file 142 in storage device 100. At step 1520, the storage allocator 144 marks the file as "discardable" or as "non-discardable" in a file system structure associated with the storage device 100 as described above. At step 1520, the file is marked also in the sense that a discarding priority level is assigned to the file.

At step 1530, when the file is a discardable file, the storage allocator 144 updates a FAT to associate a cluster chain that is allocated to the file with the file. At step 1540, the storage allocator 144 updates a location file to reflect a physical location of the file in the storage device 100. At step 1550, the storage allocator 144 manages the storage area 110 of the storage device 100 (through communication with the storage controller 120) or manages files that are stored in the storage area 110 based on the FAT and the location files.

In yet other implementations, to enhance security, and to prevent the file system from being destroyed or compromised by file system integrity utilities such as dosfsck (also known as fsck.vfat) or chkdsk, the storage allocator 144 does not allocate clusters to cluster chains sequentially in the discardable file area to ensure that cluster chains cannot be reconstructed without reading a discardable FAT, database, or one or more location files which store the physical location of a discardable file. Additionally, range files are generated in the FAT that are associated with one or more of the scrambled clusters of the cluster chain so that utilities such as dosfsck will not turn discardable files into non-discardable files or reset the flag in the upper bits of the file indicating that the file is discardable. In some implementations, an attribute such as a hidden, system, directory, or volume attribute may be enabled that is associated with a range file to prevent a host operating system from accessing the range files.

FIG. 16 is a chart representing a FAT including a cluster chain in which an order of two or more clusters that comprise the cluster chain have been scrambled. As shown in FIG. 16, the clusters that comprise a cluster chain that starts at entry 1602 are not contiguous. For example, the order of the cluster chain starting at entry 1602 is cluster #13, cluster #9, cluster #7, cluster #18, and cluster #21. In the FAT, the value of each cluster points to the next cluster in the cluster chain, as described above with respect to FIGS. 7 and 8.

In addition to scrambling the order of the clusters that comprise a cluster chain associated with one or more files, one or more range files may be created in the FAT that comprise one or more clusters of the cluster chain that is associated with the file. In some implementations, each range file may represent all clusters within a range of clusters that are part of a cluster chain. Due to the association between the range files and the clusters that comprise the cluster chain, utilities such as chkdsk or fsck.vfat will not turn the discardable file into non-discardable files and FAT recovery utilities will not reset the flags in a FAT32 entry indication that the file is a discardable file.

FIG. 17 is a chart illustrating one or more range files that are created in the FAT, that each stores at least one cluster of the cluster chain starting at entry 1602. For example, a first range file 1604 stores cluster #7 and cluster #9 from the cluster chain starting at entry 1602, and a second range file 1606 stores cluster #13, cluster #18, and cluster #21 from the cluster chain starting at entry 1602.

A range file may store clusters from more than one cluster chain. For example, in addition to the clusters listed above from the cluster chain starting at entry 1602, the first range file 1604 may store cluster #5 and cluster #10 from the cluster chain starting at entry 1608. Similarly, in addition to the clusters listed above from the cluster chain starting at entry 1602, the second range file 1606 may storage cluster #16, cluster #17, and cluster #22 from the cluster chain starting at entry 1608.

Figures 18, 19:
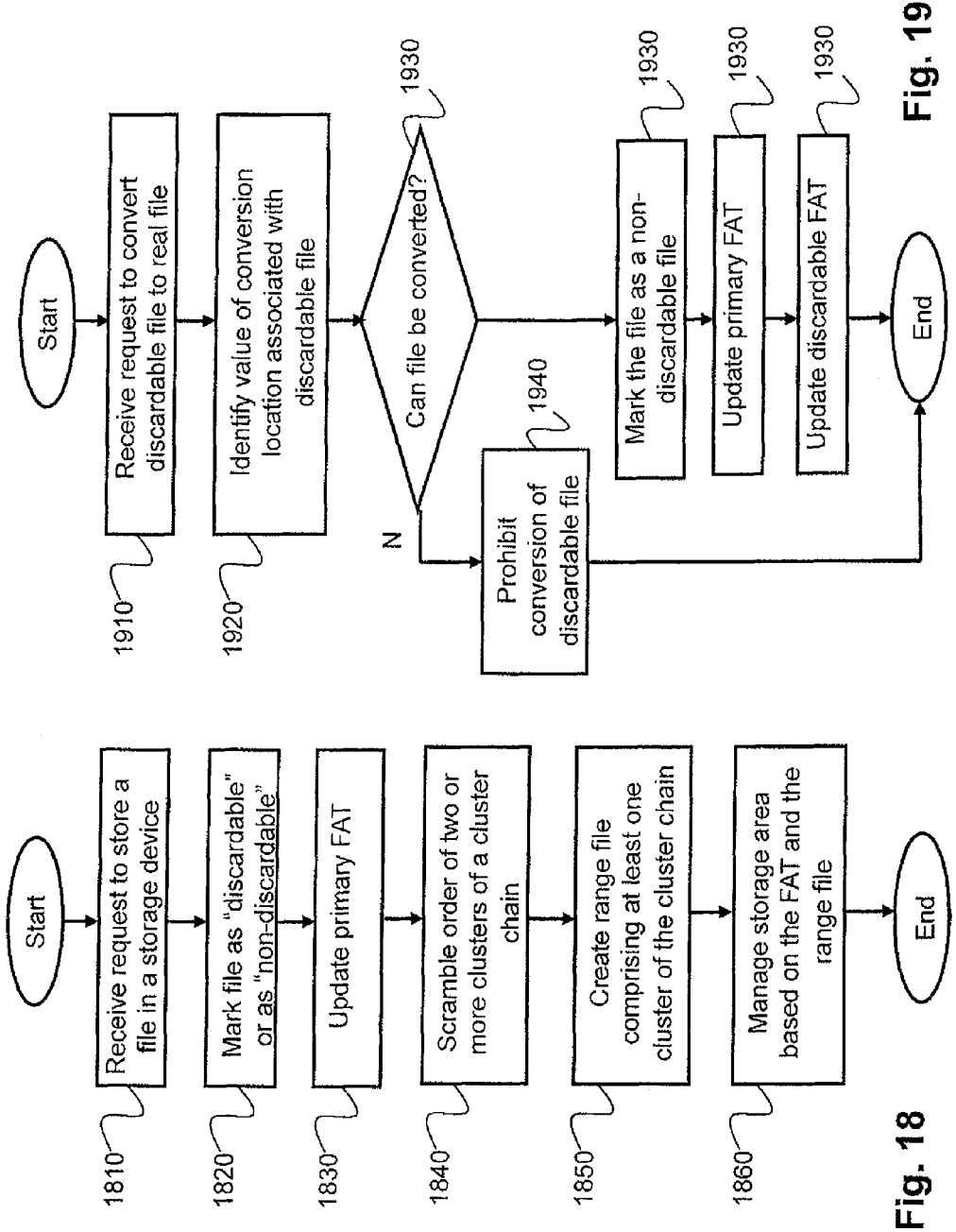
FIG. 18 is a flow chart of a method for managing a storage device using a FAT in which an order of two or more clusters that comprise a cluster chain is scrambled.
FIG. 19 is a flow chart of a method for utilizing conversion locks to prevent a conversion of a discardable file when the discardable file is open in a file system implementing a primary FAT and a discardable FAT.

FIG. 18 is a method for managing a storage device using a FAT in which an order of two or more clusters that comprise a cluster chain is scrambled. FIG. 18 will be described in association with FIG. 1. At step 1810, host 140 receives a request to store file 142 in storage device 100. At step 1820, the storage allocator 144 marks the file as "discardable" or as "non-discardable" in a file system structure associated with the storage device 100 as described above. At step 1820, the file is marked also in the sense that a discarding priority level is assigned to the file.

At step 1830, when the file is a discardable file, the storage allocator 144 updates a FAT to associate a cluster chain that is allocated to the file with the file. At step 1840, an order of two or more clusters of the cluster chain that are associated with the file are scrambled within the FAT based on factors such as an amount of memory within the storage device 100, a total size of a cluster chain, a number of clusters between two sequential clusters of a cluster chain, and/or flash memory management algorithms that may consider an erase block size, a physical block address of each logical address in an allocated block, and/or wear leveling data for each page associated with a physical block address. In some implementation the order of two or more clusters of the cluster chain are scrambled using a pseudo-random number generator or entropic random number generator, which provides an offset within a range for each cluster that has not been previously allocated. In other implementations, the order of two or more clusters of the cluster chain is scrambled using a one-way hash function that takes into account non-deterministic values from the host system 140 and/or the storage device 100.

At step 1850, a first range file is created in the FAT that comprises at least one cluster of the cluster chain that is associated with the first file. At step 1860, the storage allocator 144 manages the storage area 110 of the storage device 100 (through communication with the storage controller 120) or manages files that are stored in the storage area 110 based on the FAT and the range files.

In yet other implementations, the file system may implement conversion locks to ensure that a discardable file is not converted to a non-discardable file while the discardable file is open. A discardable file may be open, for example, during a period of time while the discardable file is being downloaded to the storage device 100 or during a period of time before data associated with discardable file is to be released to the public, such as when the discardable file is downloaded to the storage device 100 before a release date associated with a movie, song, or program that is associated with the discardable file. Generally, the conversions locks operate such that a discardable file cannot be converted to a non-discardable file when the conversion lock is set.

FIG. 19 is a method for utilizing conversion locks to prevent a conversion of a discardable file when the discardable file is open in a file system implementing a primary FAT and a discardable FAT. FIG. 19 will be described in association with FIG. 1. At step 1910, the storage allocator 144 receives a request to convert a discardable file to a non-discardable file. At step 1920, the storage allocator 144 identifies a value of a conversion lock identifier associated with the discardable file. At step 1930, the storage allocator 144 determines whether the discardable file may be converted to a non-discardable file based on the value of the conversion lock identifier. Typically, the storage allocator 144 will determine that the discardable file may not be converted when the value of the conversion lock identifier indicates that the discardable file is open and the storage allocator 144 will determine that the discardable file may be converted when the value of the conversion lock identifier indicates that the discardable file is not open.

If the storage allocator 144 determines at step 1930 that the discardable file may not be converted to a non-discardable file, the storage allocator 144 prohibits the marking of the discardable file as non-discardable at step 1940. However, if the storage allocator 144 determines at step 1930 that the discardable file may be converted to a non-discardable file, the storage allocator 144 proceeds to mark the file as a non-discardable file in the file system structure associated with the storage device 100 at step 1950; update the primary FAT to reflect a physical location of the file at step 1960; and to update the discardable FAT to remove the physical location of the file at step 1970.

It will be appreciated that similar methods are implemented with a conversion lock when a database or location file are used with a primary FAT in place of the discardable FAT as described above.

In some implementations, an application may be permitted to perform operations such as converting a discardable file to a non-discardable file, or checking a value of a conversion lock identifier, based on an identifier associated with the application. Typically, an application that creates or downloads a discardable file may associate a user IDENTIFIER (ID) with the discardable file. The user ID may be an owner user ID that identifies the application or user that created the discardable file. In some implementations, the owner user ID is a 4-byte value.

The file system 160 provides the owner user ID the ability to define what additional user IDs, associated with other users or applications, may access the discardable file and what actions the additional user IDs may take with respect to the discardable file. It will be appreciated that depending on the use of the discardable file, an additional user ID may be associated with a single application or a single user, or the additional user ID may be a shared user ID that is associated with multiple applications or multiple users.

In some implementations, the owner user ID may allow an application associated with an additional user ID to access preview data associated with the discardable file. The preview data may be part of the discardable file where in other implementations the preview data is distinct from, but associated with, the discardable file. In some exemplary implementations, a discardable file may be a movie and preview data may include a movie trailer associated with the movie; a discardable file may be a television program and preview data may include a portion of the television program; a discardable file may be music data and preview data may include a portion of the music data; or a discardable file may be a software program and preview data may include a demo version of the software program. In other exemplary implementations, preview data may be utilized such that before a release date associated with a discardable file the discardable file may not be accessed but the preview data associated with the discardable file may be accessed, and then after the release date, both the discardable file and the preview data may be accessed. In another example, the owner user ID may allow an application associated with an additional user ID to write to a discardable file based on a user ID associated with the discardable file.

In some implementations, the file system may provide permission bit masks for the owner user ID to define what operations applications associated with an additional user ID may perform with respect to a discardable file. One example of permission bit masks for typical usage scenarios is shown in FIG. 20. However, it should be appreciated that the owner user ID can override the permissions shown in FIG. 20 and assign any permission to additional user IDs.

Referring to the permissions shown in FIG. 20, an application with a properties write permission bit 2002 set may modify attributes such as enabling or disabling a conversion lock, setting a time stamp, or writing a consumption intent universal resource indicator ("URI") and an application with a properties read permission bit 2004 set may read attributes such as a conversion lock, a time stamp, or a consumption intent URI. An application with a priority permission bit 2006 set can modify a priority level of a discardable file. An application with a preview read permission bit 2008 set can read preview data associated with a discardable file and an application with a preview write permission bit 2010 set can write preview data associated with a discardable file. An application with a read permission bit 2012 set may read a discardable file and an application with a write permission bit 2014 set may write to a discardable file. Typically, only an application associated with an owner user ID that is associated with a discardable file will have these permissions. An application with a convert permission bit 2016 set can convert a discardable file to a non-discardable file.

It is noted that the methodology disclosed herein, of marking files and assigning to them discarding levels in associated file system, may have many useful applications, one of which is restoring a storage usage safety margin to guarantee sufficient storage space for user files. For example, a discarding level assigned to a file may be used to remap file clusters to a lower-performing flash module, or to clear the clusters upon request.

Smart Caching for Large Files

Further to the methods of managing data, also referred to as Smart Caching, described above, and to the descriptions and features of Smart Caching described in pending U.S. application Ser. No. 12/336,089, filed Dec. 16, 2008, and in pending U.S. Provisional App. No. 61/159,034, filed Mar. 10, 2009, both of which are hereby incorporated by reference, a Smart Caching technique for large discardable files is provided. This large file Smart Caching, also referred to herein as Smart Caching HD, includes several changes and extensions from the above disclosures. Smart Caching HD differs from Smart Caching in its support for files larger than 4 GB, by the addition of a Large File Manager that intelligently handles the split of such files upon conversion, while maintaining their large (>4 GB) status while they are discardable. Specifically, this allows for the management and retrieval of these files as well as their discarding as single units instead of as series of smaller files.

Components

The Smart Caching components are described in block diagram of FIG. 21. The Smart Caching components 2100 may be operated in conjunction with any of a number of operating systems, such as ANDROID, WINDOWS or LINUX. Alternatively, the Smart Caching techniques discussed herein may be implemented on a storage medium, such as a memory card without an operating system. The new component added for Smart Cache HD is the Large File Manager 2102, which handles files greater in size than 4 GB. The Large File Manager is described in more detail below.

Large Discardable Files

A file system that contains discardable files is conceptually organized as illustrated in the file system structure of FIG. 22. The file system is similar in structure to a standard FAT32 file system as found in SD-HC (and corresponding high capacity µSD) cards. In the Discardable Files HD implementation, discardable files are stored in a shadow FAT.

Shadow FAT

The original two FAT tables allocate the discardable clusters using only the 0xpFFFFFFF (EOF) or 0xp00000000 (unallocated) value, indicating the priority of the file but not its actual chain. If the most significant nibble is nonzero, the third FAT table is consulted to determine the actual cluster chain sequence. Unlike in the original two FAT tables, the Discardable FAT (DFAT) table may contain cluster chains that are longer than 4 GB.

Directory Tables

The directory entry for a discardable file has the following elements. Elements that may be encrypted are represented as blobs (binary large objects) in encrypted variations of the system, which may be unified into a single blob. These fields are described herein:

TABLE 1

Discardable File Directory Entry

| Type | Element Name |
|---|---|
| Integer (Primary Key) | File ID |
| Integer | Create Date/Time |
| Long Integer | Size (this is different from the Smart Cache implementation) |
| Integer/Blob | First Cluster Number |
| Integer/Blob | Owner User ID |
| Integer/Blob | Permission Bitmap |
| Integer/Blob | Priority |
| Integer/Blob | Preview Type |
| Integer/Blob | Preview Size |
| Integer/Blob | Preview First Cluster Number |
| Text | Namespace |
| Text | Filename |
| Blob | Billing Reference |
| Integer/Blob | Last Cluster Number |
| Integer/Blob | Last Cluster Number |
| Integer | Expiration Date |

TABLE 1-continued

Discardable File Directory Entry

| Type | Element Name |
|---|---|
| Byte | Active |
| Text | MIME type (this is different from the Smart Cache implementation) |

Note:
Integer size is 32 bits. Long integer size is 64 bits.

Large File Manager

The Large File Manager (LFM) is a process handler implemented within Smart Caching HD to handle files greater than 4 GB. Conceptually, the LFM consists of a file parser and a set of predefined split algorithms, as illustrated in FIG. 23. The LFM may be implemented on a host or, if the other Smart Caching components are on the storage device, on a storage device.

The file parser uses well-known methods of identifying files (such as those used in the Linux file command) as well as consulting the MIME type, if it was stored in the discardable file directory entry. The type database is a simple table of file types and their corresponding split handlers, which are incorporated within the LFM. The illustration shows three split handlers, although additional split handlers may be incorporated as needed. Typically, a split handler will have interfaces for the following:

Verifying the structure of a discardable file;
Calculating the total number of segments that the file should be split into. (While this would typically be the size of the file divided by 4 GB, file format constraints may require additional files;
Creating headers for each segment of the file; and
Calculating the offset of each segment boundary.

The actual splitting of the file is done during conversion as described below.

Conversion Flow

Figure 24:
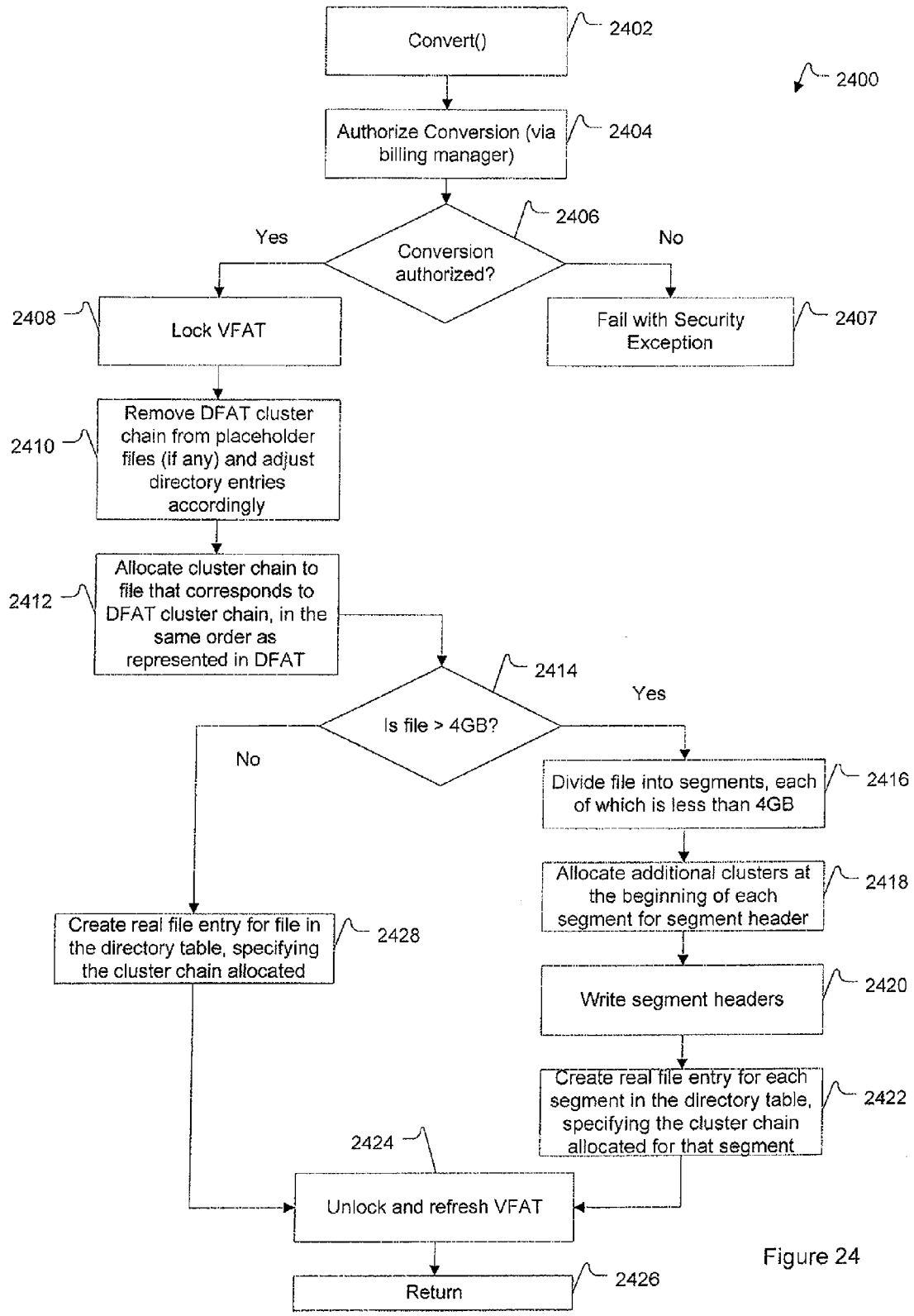
FIG. 24 depicts the conversion flow for large discardable files.

The conversion flow in Smart Caching HD is shown in FIG. 24. The process 2400 begins at step 2402 with the invocation of the convert( ) function by an application. The convert( ) function authorizes the process of conversion via a billing mechanism (as described in the Smart Caching application) at step 2404. If the conversion is not authorized at step 2406, a security exception results at step 2407. If the conversion is authorized at step 2406, the next step is to lock the file system at step 2408 so that other processes and device drivers do not modify it during the conversion process, and to allow for a refresh of the file system after the process is complete. Following this, the cluster chain for the file to be converted is allocated in the FAT1 and FAT2 tables of the volume at steps 2410 and 2412, decoupling the chain from any existing placeholder file placed for dosfsck protection purposes, and reordering the cluster chain if necessary. If the file is less than 4 GB in total length at step 2414, a directory entry for the file is created at steps 2416, 2418, 2420, and 2422, and the file system is unlocked and refreshed at step 2424, ending the convert( ) flow at step 2426.

Figure 25:
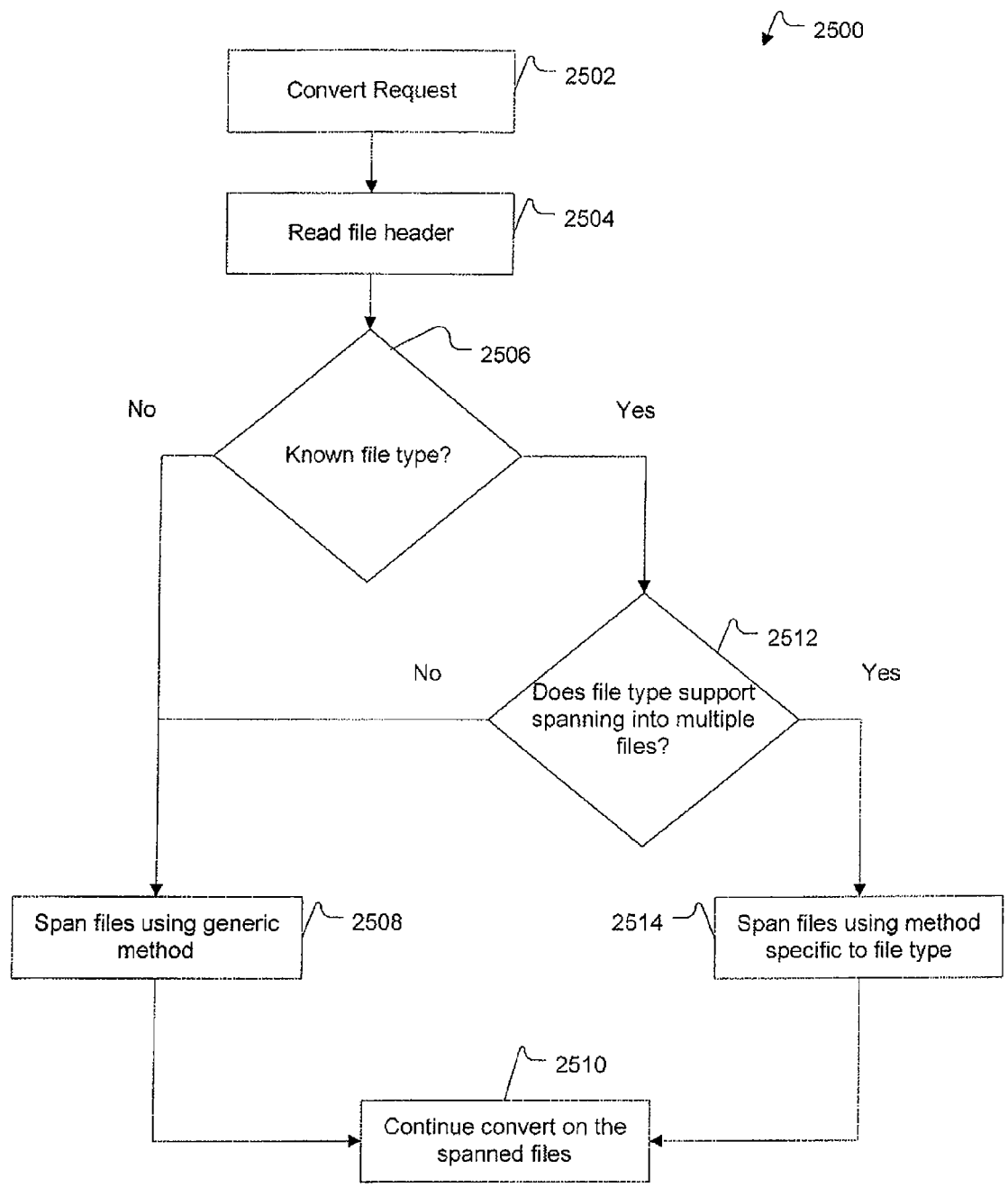
FIG. 25 is a flow chart illustrating a method of processing a convert request with the Large File Manager

If the file is greater than 4 GB in total length, the process proceeds to step 2428. Files greater than 4 GB are generally HD media files, which may be divided into segments that will be played sequentially. These segments may be linked together during playback, providing a seamless playback experience. However, a simple split of the file into 4 GB segments may cut the file in the middle of a frame, or cause one or more of the segments to lose metadata necessary to identify or play the file (such as file headers). Thus, each segment begins with a metadata header generated by the LFM, appropriate to the format. Some file types do not naturally divide into segments, such as documents or executable files, and these files cannot be converted into smaller segments using this strategy. In such files, the Large File Manager may use a compression library such as ZIP, which supports splitting while maintaining the order of the files. The Large File Manager uses the flow illustrated in FIG. 25 when converting files.

The process 2500 of managing files of length greater than 4 GB begins at step 2502 with a conversion request by an application. A header of the file is read at step 2504 and a determination is made if the file is of a known type at step 2506. If the file is not of a known type, the process proceed to step 2508 where the file in spanned into multiple files using a generic method and the conversion process continues on the spanned files at step 2510.

If the file is of a known type at step 2506, a determination is made at step 2512 of whether the file type supports spanning into multiple files. If the file type supports spanning into multiple files, the file is spanned into multiple files using a method specific to the file type at step 2514 before proceeding to step 2510. However, if the file type does not support spanning into multiple files, the file is spanned into multiple files using a generic method at step 2508 before proceeding to step 2510.

Figure 26:
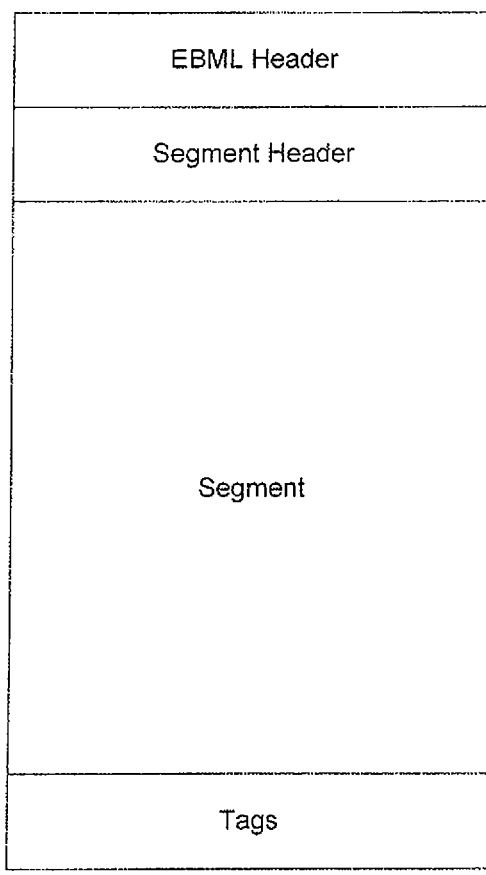
FIG. 26 depicts a Matroska file structure as an example of a file that can be split.

As an example of a method specific to a file type, the FIG. 26 depicts a simplified view of the open source Matroska (mkv) container file format, commonly used in high definition video streams. Matroska files typically consist of a file header (an Extensible Binary Meta-Language (EBML) header), followed by one segment, and ending in tags. These files may be longer than 4 GB, but such large files cannot be represented effectively in a FAT32 file system. To split these files, the segment itself is divided into multiple files, each of which has its own EBML header and a segment header. Within the segment header are fields that aid in linking split files, as follows:

TABLE 2

SegmentInfo structure (partial)

| Field Name | Type | Description |
|---|---|---|
| SegmentUID | GUID (128 bit number) | a unique 128 bit number identifying a Segment. Obviously, a file can only be referred to by another file if a SegmentUID is present, however, playback is possible without that UID. |
| SegmentFileName | Character string | Filename the segment is stored in. |
| PrevUID | GUID | The unique 128-bit GUID of the previous segment (the segment with a timecode before the current segment) |
| PrevFilename | Character string | The filename wherein the previous segment resides |
| NextUID | GUID | The unique 128-bit GUID of the next segment |
| NextFilename | Character string | The filename wherein the next segment resides |

The process of splitting a Matroska file involves allocating and creating new MKV files for each split segment, and attaching EBML headers and rewritten segment headers for each segment.

Figure 27:
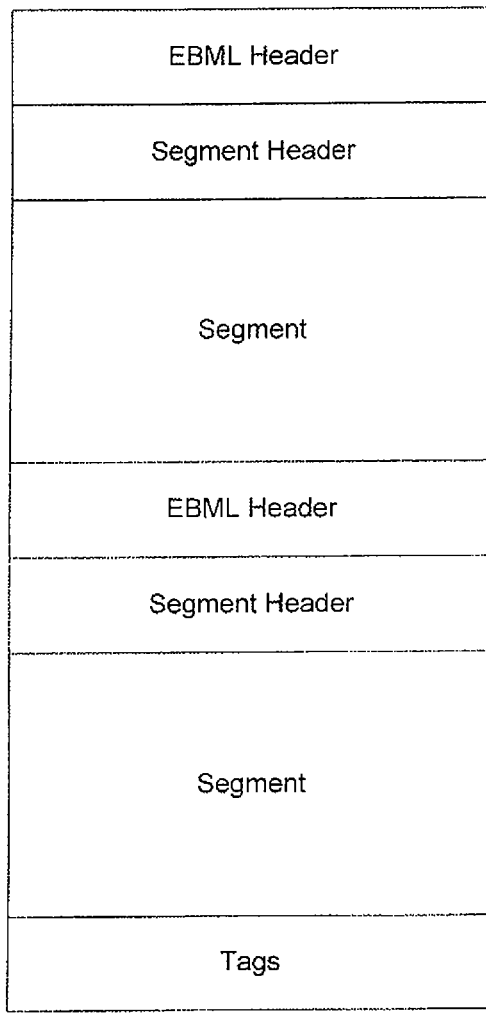
FIG. 27 depicts a split Matroska file.

The Large File Manager incorporates support for various file types such as Matroska, in each case performing an in-place split transparently for the file type, by using the specific split handlers for each file type. The in-place split is done without moving the data within the file, by adding clusters to the cluster chain containing the new header information as illustrated in FIG. 27, and then splitting the cluster chain into multiple files by adding new directory entries for each file and assigning a FCN to each one at the appropriate point in the chain. (The cluster number immediately preceding the FCN in the chain will point to an EOF marker). A similar flow exists for other file types, contained within the Large File Manager. The Large File Manager automatically detects the file type and creates an in-place split accordingly.

The present application includes methods and system for managing a storage device. In one implementation, a storage allocator that is present in a host or a storage device receives a request to store a file in a storage area of the storage device. The storage allocator marks the file as discardable in a file system structure associated with the storage device and updates a primary file allocation table ("FAT") to associate a cluster chain that is allocated to the file with the file. The storage allocator additionally updates a discardable FAT or a database to reflect a physical location of the file, or may generate one or more location files that store the physical location of the file. The storage allocator then manages the storage area device based on the FAT and a discardable FAT, database, or one more location files indicating the physical location of the file.

A number of methods and systems have been disclosed above and may be implemented in numerous ways. Examples of just some of the combinations of implementations are provided below, however these are not limiting and additional features and combinations are contemplated.

In one implementation, a first method for managing a storage device may include, in a host to which a storage device is operatively coupled: receiving a request to store a first file in a storage area of the storage device, wherein the storage contains a primary FAT and, in addition, a discardable FAT; marking the first file as discardable, the marking of the first file being done in a file system structure associated with the storage device; causing the storage device to update the primary FAT to associate a cluster chain that is allocated to the first file with the first file; causing the storage device to update the discardable FAT to reflect a physical location of the first file in the storage device; and managing the storage area of the storage device in accordance with the discardable FAT.

In this method the cluster chain masks at least the physical location of the first file and the cluster chain of the primary FAT may point to a location in the discardable FAT. Managing the storage area of the storage device in accordance with the discardable FAT may include any one or a combination of restoring a storage usage safety margin by selectively removing one or more files marked as discardable; freeing a storage area by removing all files marked as discardable; or remapping clusters of the first file to a lower-performance storage module.

The first method may also include enabling an attribute associated with the first file to prevent a host operating system from accessing the first file. Alternatively, the first method may also include receiving a request to store a second file in the storage area of the storage device; marking the second file as discardable, the marking of the second file being done in the file system structure associated with the storage device; causing the storage device to update the primary FAT to associate the cluster chain with the second file, where the cluster chain is associated with the first file and the second file; and causing the storage device to update the discardable FAT to reflect a physical location of the second file. The cluster chain may mask the physical location of the first file and the second file.

The first method above may also include receiving a request to store a second file in the storage area of the storage device; marking the second file as discardable, the marking of the second file being done in the file system structure associated with the storage device; causing the storage device to update the primary FAT to associate a second cluster chain that is allocated to the second file with the second file; and causing the storage device to update the discardable FAT to reflect the physical location of the second file.

The first method may alternatively include marking the first file as a non-discardable file, the marking of the first file being done in the file system structure associated with the storage device; causing the storage device to update the primary FAT to reflect the physical location of the first file; and causing the storage device to update the discardable FAT to remove the physical location of the first file. This alternative of the first method may further include identifying a value of a conversion lock identifier associated with the first file to determine whether the first file may be converted from a discardable file to a non-discardable file, where the first file is marked as a non-discardable file after determining the value of the conversion lock identifier associated with the first file indicates that the first file is not locked.

In another alternative of the first method, additional steps may be included of identifying a value of a conversion lock identifier associated with the first file to determine whether the first file may be converted from a discardable file to a non-discardable file; and prohibiting the marking of the first file as non-discardable after determining the value of the convert lock associated with the first file indicates that the first file is locked. The first method may alternatively include identifying file permissions associated with a user ID and a preview file associated with the first file, and managing access to the preview file associated with the first file based on the identified file permissions. The user ID may be a shared user ID.

In the first method, marking the first file as discardable may include assigning a discarding priority level to the first file. Additionally, assigning the discarding priority level to the first file may include at least one of setting a corresponding value to m most significant bits in the primary FAT entry corresponding to the first file, or setting a corresponding value to a data field in a file system entry corresponding to the first file. The discarding priority level may be assigned to the first file according to any one of anticipated usage of the first file; anticipated revenue associated with using the file; a type of file of the first file; a size of the first file; a location of the first file in the storage device; and an age of the first file.

In another implementation, a second method for managing a storage device may include, in a storage device operatively coupled to a host: receiving a request to store a first file in a storage area of the storage device, wherein the storage device contains a primary FAT and, in addition, a discardable FAT; marking the first file as discardable, the marking of the first file being done in a file system structure associated with the storage device; updating the primary FAT to associate a cluster chain that is allocated to the first file with the first file; updating the discardable FAT to reflect a physical location of the first file in the storage device; and managing the storage area of the storage device in accordance with the discardable FAT. The cluster chain may mask at least the physical location of the first file. The second method may additionally include enabling an attribute associated with the first file to prevent a host operating system from accessing the first file. The cluster chain of the primary FAT may point to a location in the discardable FAT.

In one variation, the second method may further include receiving a request to store a second file in the storage area of the storage device; marking the second file as discardable in the file system structure associated with the storage device; updating the primary FAT to associate the cluster chain with the second file, where the cluster chain is associated with the first file and the second file; and updating the discardable FAT to reflect a physical location of the second file. In this variation, the cluster chain may mask the physical location of the first file and the second file.

In another implementation, the second method may further include receiving a request to store a second file in the storage area of the storage device; marking the second file as discardable in the file system structure associated with the storage device; updating the primary FAT to associate a second cluster chain that is allocated to the second file with the second file; and updating the discardable FAT to reflect the physical location of the second file.

Alternatively, the second method may further include marking the first file as a non-discardable file in the file system structure associated with the storage device; updating the primary FAT to reflect the physical location of the first file; and updating the discardable FAT to remove the physical location of the first file. This alternative of the second method may further include identifying a value of a conversion lock identifier associated with the first file to determine whether the first file may be converted from a discardable file to a non-discardable file, where the first file is marked as a non-discardable file after determining the value of the conversion lock identifier associated with the first file indicates that the first file is not locked.

Another version of the second method further includes identifying a value of a conversion lock identifier associated with the first file to determine whether the first file may be converted from a discardable file to a non-discardable file; and prohibiting the marking of the first file as non-discardable after determining the value of the convert lock associated with the first file indicates that the first file is locked. Yet another version of the second further includes identifying file permissions associated with a user ID and a preview file associated with the first file; and managing access to the preview file associated with the first file based on the identified file permissions. The user ID may be a shared user ID.

In the second method, the marking the first file as discardable may include assigning a discarding priority level to the first file. Assigning the discarding priority level to the first file may include at least one of setting a corresponding value to m most significant bits in the primary FAT entry corresponding to the first file, or setting a corresponding value to a data field in a file system entry corresponding to the first file. Alternatively, the discarding priority level may be assigned to the first file according to any one of anticipated usage of the first file; anticipated revenue associated with using the file; a type of file of the first file; a size of the first file; a location of the first file in the storage device; or an age of the first file.

In the second method, managing the storage area of the storage device in accordance with the discardable FAT comprises any one or a combination of: restoring a storage usage safety margin by selectively removing one or more files marked as discardable; freeing a storage area by removing all files marked as discardable; or remapping clusters of the first file t a lower-performance storage module.

A storage allocator for managing a storage device may include a communication interface to interface a storage device and a host of the storage device; a storage unit for storing a file system associated with the storage device; and a processor for managing the file system associated with the storage device, where the processor is configured to: receive a request to store a first file in a storage area of the storage device, where the storage device contains a primary FAT and, in addition, a discardable FAT; mark the first file as discardable, the marking of the first file being done in a file system structure associated with the storage device; cause the storage device to update the primary FAT to associate a cluster chain that is allocated to the first file with the first file; cause the storage device to update the discardable FAT to reflect a physical location of the first file in the storage device; and manage the storage area of the storage device in accordance with the discardable FAT. The cluster chain masks a physical location of the first file. The cluster chain of the first FAT may point to a location in the second FAT.

Alternatively, the processor may be further configured to receive a request to store a second file in the storage area of the storage device; mark the second file as discardable in the file system structure associated with the storage device; cause the storage device to update the primary FAT to associated the cluster chain with the second file, where the cluster chain is associated with the first file and the second file; and cause the storage device to update the second FAT to reflect a physical location of the second file, where the discardable cluster chain masks the physical location of the first file and the second file.

In another variation of the storage locater noted above, the processor may be further configured to receive a request to store a second file in the storage area of the storage device; mark the second file as discardable in the file system structure associated with the storage device; cause the storage device to update the primary FAT to associate a second cluster chain that is allocated to the second file with the second file; and cause the storage device to update the discardable FAT to reflect a physical location of the second file. This variation of the storage locater may have the processor further configured to mark the first file as a non-discardable file in the file system structure associated with the storage device; cause the storage device to update the primary FAT to reflect the physical location of the first file; and cause the storage device to update the discardable FAT to remove the physical location of the first file. In addition, the processor may be further configured to identify a value of a conversion lock identifier associated with the first file to determine whether the first file may be converted from a discardable file to a non-discardable file, where the first file is marked as a non-discardable file after determining the value of the conversion lock identifier associated with the first file indicates that the first file is not locked.

In other implementations, the storage allocator may have the processor further configured to identify a value of a conversion lock identifier associated with the first file to determine whether the first file may be converted from a discardable file to a non-discardable file; and prohibit the marking of the first file as non-discardable after determining the value of the conversion lock identifier associated with the first file indicates that the first file is locked. Alternatively, the processor of the storage allocator may be further configured to identify file permissions associated with a user ID and a preview file associated with the first file; and to manage access to the preview file associated with the first file based on the identified file permissions.

A storage system has also been disclosed having a communication interface; and a storage allocator for managing a file system associated with a storage device. The storage allocator may include a processor for managing storage of one or more files in a storage area of the storage device, where the processor is configured in the same ways as the storage allocator described above. In different implementations, the storage allocator of the storage system may be embedded in a host or in a storage device. The storage system may also be arranged such that, to receive a request via the communication interface, the processor is configured to derive the request to store the first file based on one or more write requests associated with the first file that are received via the communication interface.

A third method for managing a storage device is also disclosed, where the method includes, in a host to which a storage device is operatively coupled, receiving a request to store a first file in a storage area of the storage device; marking the first file as discardable in a file system structure associated with the storage device; causing the storage device to update a FAT to associate a cluster chain that is allocated to the first file with the first file; updating a database to reflect a physical location of the first file in the storage device; and managing the storage area of the storage device in accordance with the FAT and the database.

A fourth method for managing a method for managing a storage device includes, in a storage device operatively coupled to a host, receiving a request to store a first file in a storage area of the storage device; marking the first file as discardable, the marking of the first file being done in a file system structure associated with the storage device; updating a FAT to associate a cluster chain that is allocated to the first file with the first file; updating a database to reflect a physical location of the first file in the storage device; and managing the storage area of the storage device in accordance with the FAT and the database.

A fifth method for managing a storage device includes steps related to those of the fourth method set forth above, but from the perspective of a host rather than the storage device. More particularly, the fifth method includes, in a host to which a storage device is operatively coupled, receiving a request to store a first file in a storage area of the storage device; marking the first file as discardable in a file system structure associated with the storage device; causing a storage device to update a FAT to associate a cluster chain that is allocated to the first file with the first file; updating a location file to reflect a physical location of the first file in the storage device; and managing the storage area of the storage device in accordance with the FAT and the location file. The location file may be a file such as a text file or a binary file.

A sixth method for managing a storage device includes, in a host to which a storage device is operatively coupled receiving a request to store a first file in a storage area of the storage device; marking the first file as discardable in a file system structure associated with the storage device; causing the storage device to update a FAT to associate a cluster chain that is allocated to the first file with the first file; scrambling an order of two or more clusters of the cluster chain that are associated with the first file within the FAT; creating a first range file in the FAT which comprises at least one cluster of the cluster chain that is associated with the first file; and managing the storage area of the storage device in accordance with the FAT and the first range file.

The sixth method may further include receiving a request to store a second file in the storage area of the storage device; marking the second file as discardable in the file system structure associated with the storage device; causing the storage device to update the FAT to associate the cluster chain with the second file, where the cluster chain is associated with the first file and the second file; and scrambling an order of two or more clusters of the cluster chain that are associated with the second file within the FAT. Additionally, the sixth method may further include updating the first range file in the FAT to comprise at least one cluster of the cluster chain associated with the second file.

In a variation of the sixth method, the method may further comprise receiving a request to store a second file in the storage area of the storage device; marking the second file as discardable in the file system structure associated with the storage device; causing the storage device to update the FAT to associate a second cluster chain that is allocated to the second file with the second file; scrambling an order of two or more clusters of the second cluster chain that are associated with the second file within the FAT; creating a second range file in the FAT which comprise at least one cluster of the cluster chain associated with the second file; where managing the storage area of the storage device in accordance with the FAT and the first range file includes managing the storage area of the storage device in accordance with the FAT, the first range file and the second range file.

In another variation of the sixth method, the method may further include creating a second range file in the FAT that has at least one cluster of the cluster chain that is associated with the first file that does not comprise the first range file, where managing the storage area of the storage device in accordance with the FAT and the first range file include managing the storage area of the storage device in accordance with the FAT, the first range file, and the second range file.

A seventh method for managing a storage device includes steps related to those of the sixth method set forth above, but from the perspective of a storage device rather than a host rather than the storage device. More particularly, the seventh method includes, in a storage device that is coupled to a host, receiving a request to store a first file in a storage area of the storage device; marking the first file as discardable, the marking of the first file being done in a file system structure associated with the storage device; updating a FAT to associate a cluster chain that is allocated to the first file with the first file; scrambling an order of two or more clusters of the cluster chain that are associated with the first file within the FAT; creating a first range file in the FAT which comprises at least one cluster of the cluster chain that is associated with the first file; and managing the storage area of the storage device in accordance with the FAT and the first range file. The variations of this seventh method parallel those of the sixth method noted above.

According to an eighth method, a method for managing operations associated with a discardable file in a host to which a storage device is operatively coupled includes associating an owner user ID with a discardable file, where the discardable file comprises a file that has been marked as discardable in a file system structure associated with the storage device; defining, with an application associated with the owner user ID, a set of permissions for an additional user ID associated with the discardable file; receiving a request to perform an operation associated with the discardable file from an application associated with the additional user ID; determining whether the application associated with the additional user ID may perform the operation based on the set of permissions; and managing the operation associated with the discardable file based on the determination.

In variations of this eighth method, the application associated with the owner user ID may download the discardable file to the storage device. Alternatively, the operation associated with the discardable file may include modifying an attribute associated with the discardable file. In other variations of the eighth method, the method may further include reading an attribute associated with the discardable file. The attribute may be at least one of a conversion lock identifier, a time stamp, a consumption intent universal resource indicator, or a priority level. In yet other variations of the eighth method, the operation may include reading the discardable file, writing to the discardable file, writing preview data associated with the discardable file or reading preview data associated with the discardable file. The discardable file may include the preview data or be distinct from the preview data in different implementations.

The additional user ID of the eighth method may be a shared user ID associated with multiple users. Alternatively, the additional user ID of the eighth method may be a shared user ID associated with multiple applications. In one additional variation of the eighth method, managing the operation associated with the discardable file based on the determination may include prohibiting the application associated with the additional user ID from performing the operation associated with the discardable file. In another additional variation, managing the operation associated with the discardable file based on the determination includes allowing the application associated with the additional user ID to perform the operation associated with the discardable file.

A storage system is also contemplated having a communication interface and a storage allocator for managing a file system associated with a storage device. The storage allocator may include a processor for managing operations associated with a discardable file that is stored in the storage device, where the processor is configured to associate an owner user ID with the discardable file, where the discardable file comprises a file that has been marked as discardable in a file system structure associated with the storage device; define, with an application associated with the owner user ID, a set of permissions for an additional user ID associated with the discardable file; receive a request over the communication interface to perform an operation associated with the discardable file from an application associated with the additional user ID; determine whether the application associated with the additional user ID may perform the operation based on the set of permissions; and manage the operation associated with the discardable file based on the determination. To manage the operation associated with the discardable file, the processor may be configured to allow the application associated with the additional user ID to read preview data associated with the discardable file. The additional user ID may be a shared user ID associated with multiple users or a shared user ID associated with multiple applications.

A ninth method for managing a storage device may include, in a host to which a storage device is operatively coupled, storing preview data in the storage device; associating the preview data with a discardable file, where the discardable file is a file that has been marked as discardable in a file system structure associated with the storage device; and managing access to the preview data and the discardable file such that an application is permitted to access the preview data but is not permitted to access the discardable file. The discardable file may be the preview data distinct from the preview data. In alternative implementations of the ninth method, the discardable file may be a movie and the preview data a movie trailer associated with the movie, the discardable file may be a television program and the preview data a portion of the television program, the discardable file may be music data and the preview data a portion of the music data, or the discardable file may be a program and the preview data a demo version of the program.

In one alternative implementation of the ninth method, managing access to the preview data and the discardable file such that an application is permitted to access the preview data but is not permitted to access the discardable file may include managing access to the preview data and the discardable file such that an application is permitted to access the preview data but is not permitted to access the discardable file during a period of time before a release date associated with the discardable file.

Download Management

Further to the methods of managing data, also referred to as Smart Caching and Smart Caching HD, described above, Smart Cache techniques for managing a download of a discardable file to a storage area of a storage device are provided. Generally, a download manager, which in some implementations may be part of the storage allocator described above, may determine whether to delay a download to a storage area of a storage device of a discardable file based on download conditions such as a type of network that is available to download the discardable file to the storage device, a power condition available to the storage device, a period of time associated with a request to download the discardable file to the storage device, and/or an amount of available storage associated with the storage device.

For example, the download manager may determine to delay a download of a discardable file until a wireless fidelity (WiFi) network and/or a cellular network is available to download the discardable file. Similarly, the download manager may determine not to delay a download of a discardable file while a storage device is coupled with a power supply or a power level of a battery associated with a storage device is above a predetermined level, but the download manager may determine to delay a download of a discardable file while a battery associated with the storage device is charging and/or while a power level of a battery associated with a storage device is below a predetermined level. Further, the download manager may determine to delay a download of a discardable file requested during business hours when network congestion may high until evening hours, such as after 8:00 p.m., when a network may not be congested, or the download manager may determine to delay a download of a discardable file requested on a day during a work week until a day during a weekend. The download manager may additionally delay downloading a discardable file until an amount of available storage in the storage device prior to storing the discardable file in the storage area of the storage device is above a predetermined level.

Figure 28:
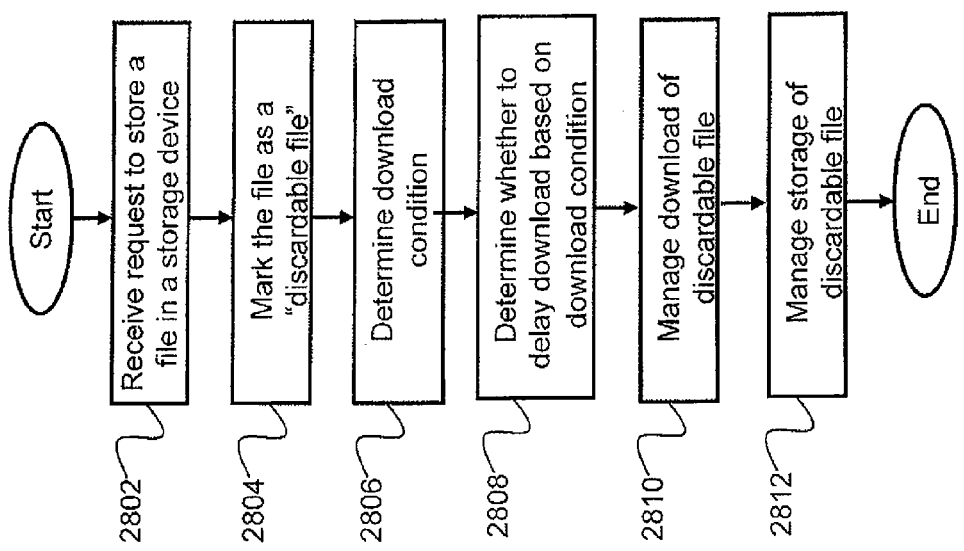
FIG. 28 is a flow chart of a method for managing a download of a discardable file to a storage area of a storage device.

FIG. 28 is a flow chart of a method for managing a download of a discardable file to a storage area of a storage device. At step 2802, a request is received to store a file in a storage area of a storage device, where the file is a discardable file and is associated with data in a data structure associated with the storage device. In some implementations, the data structure may comprise a file system structure. At step 2804, the file is marked as a "discardable file." In some implementation, the file system structure of the data structure is marked to indicate that the file is a discardable file. In other implementations, the file itself is marked to indicate that the file is a discardable file.

At step 2806, a download manager, which in some implementations may be part of a storage allocator, determines a download condition associated with the request to store the discardable file in the storage area of the storage device. For example, the download manager may determine a type of network available to download the discardable file to the storage device, a power condition available to the storage device when downloading the discardable file to the storage device, a time of day associated with the request to store the discardable file in the storage area of the storage device, and/or determine an amount of available storage space in the storage device.

At step 2808, the download manager determines whether to delay a download to the storage device of the discardable file based on the determined download condition, and at step 2810, the download manager manages the download of the discardable file to the storage device based on the determination of whether to delay the download of the discardable file to the storage device. At step 2810, the download manager may delay the download of the discardable file to the storage device until a parameter associated with the download condition is satisfied. For example, the download manager may delay the download of the discardable file until a WiFi network and/or a cellular network is available to download the discardable file to the storage device, the download manager may delay the download of the discardable file until the storage device is coupled with a power supply or a power level of a battery associated with the storage device is above a predetermined level, and/or the download manager may delay the download of the discardable file until an amount of available storage in the storage device prior to storing the discardable file in the storage area of the storage device is above a predetermined level.

At step 2812, a storage allocator, which may include the download manager, manages the storage of the downloaded discardable file in the storage area of the storage device based on the marking that the file is a discardable file, as described above.

It will be appreciated that in some implementations, one or more processors may be configured to perform the acts described above with respect to FIG. 28 based on instructions stored on a memory such as a computer-readable non-transitory storage medium. The one or more processors may be located on the host, the storage device, or a combination of both.

It is noted that the methodology disclosed herein, of marking files and assigning to them discarding levels in associated file system, may have many useful applications, one of which is restoring a storage usage safety margin to guarantee sufficient storage space for user files. For example, a discarding level assigned to a file may be used to remap file clusters to a lower-performing flash module, or to clear the clusters upon request.

The articles "a" and "an" are used herein to refer to one or to more than one (i.e., to at least one) of the grammatical object of the article, depending on the context. By way of example, depending on the context, "an element" can mean one element or more than one element. The term "including" is used herein to mean, and is used interchangeably with, the phrase "including but not limited to". The terms "or" and "and" are used herein to mean, and are used interchangeably with, the term "and/or," unless context clearly indicates otherwise. The term "such as" is used herein to mean, and is used interchangeably, with the phrase "such as but not limited to".

Having thus described exemplary embodiments of the invention, it will be apparent to those skilled in the art that modifications of the disclosed embodiments will be within the scope of the invention. Alternative embodiments may, accordingly, include more modules, fewer modules and/or functionally equivalent modules. The present disclosure is relevant to various types of mass storage devices such as SD-driven flash memory cards, flash storage devices, non-flash storage devices, "Disk-on-Key" devices that are provided with a Universal Serial Bus ("USB") interface, USB Flash Drives ("UFDs"), MultiMedia Card ("MMC"), Secure Digital ("SD"), miniSD, and microSD, and so on. Hence the scope of the claims that follow is not limited by the disclosure herein. It is therefore intended that the foregoing detailed description be regarded as illustrative rather than limiting, and that it be understood that it is the following claims, including all equivalents, that are intended to define the spirit and scope of this invention.

The invention claimed is:

1. A method for managing a storage device, the method comprising:
   in a host to which a storage device is operatively coupled:
      receiving a request originating from a content publisher to store a file in the storage device, wherein the storage device deems the file discardable;
      marking the file as a discardable file in a file system of the storage device, the file system comprising a primary file system architecture and a discardable file system architecture, wherein marking the file as a discardable file comprises:
         causing the storage device to update the primary file system architecture in the storage device to associate with the file a cluster chain that is allocated with the file, the cluster chain masking at least a physical location in the storage device associated with the file; and
         causing the storage device to update the discardable file system architecture to associate the physical location in the storage device with the file, wherein marking the file as discardable hides the file in the file system of the storage device such that the file is masked from a user and wherein the discardable file comprises unsolicited content that has not been requested by the user;
      determining a download condition associated with the request to store the discardable file in the storage device;
      determining whether to delay a download to the storage device of the discardable file based on the determined download condition and the marking of the file as a discardable file; and
      managing the download of the discardable file to the storage device based on the determination of whether to delay the download of the discardable file to the storage device.

2. The method of claim 1, wherein managing the download of the discardable file comprises:
   delaying the download of the discardable file to the storage device until a parameter associated with the download condition is satisfied.

3. The method of claim 1, wherein determining a download condition associated with the request to store the discardable file in the storage device comprises:
   determining a type of network available to download the discardable file to the storage device.

4. The method of claim 3, wherein determining a type of network available to download the discardable file to the storage device comprises:
   determining whether a wireless fidelity (WiFi) network is available to download the discardable file to the storage device.

5. The method of claim 3 wherein determining a type of network available to download the discardable file to the storage device comprises:
   determining whether a cellular network is available to download the discardable file to the storage device.

6. The method of claim 1, wherein determining a download condition associated with the request to store the discardable file in the storage device comprises:
   determining a power condition available to the storage device when downloading the discardable file to the storage device.

7. The method of claim 6, wherein determining a power condition available to the storage device when downloading the discardable file to the storage device comprises:
   determining the storage device is coupled with a power supply.

8. The method of claim 6, wherein determining a power condition available to the storage device when downloading the discardable file to the storage device comprises:
   determining that a battery associated with the storage device is charging.

9. The method of claim 6, wherein determining a power condition available to the storage device when downloading the discardable file to the storage device comprises:
   determining a power level of a battery associated with the storage device is above a predetermined level.

10. The method of claim 1, wherein determining a download condition associated with the request to store the discardable file in the storage device comprises:
    determining a time of day associated with the request to store the discardable file in the storage device.

11. The method of claim 1, wherein determining a download condition associated with the request to store the discardable file in the storage device comprises:
    determining an amount of available storage in the storage device prior to storing the discardable file in the storage device is above a predetermined level.

12. The method of claim 1, wherein marking the file as a discardable file comprises marking the file itself to indicate that the file is a discardable file.

13. The method of claim 1, wherein marking the file as a discardable file comprises assigning a discarding priority level to the file.

14. The method of claim 1, wherein the primary file system architecture comprises
    a primary file allocation table ("FAT") and the discardable file system architecture comprises a discardable FAT.

15. The method of claim 1, further comprising managing the storing of the downloaded discardable file in the storage device based on the marking of the file as a discardable file.

16. A storage system comprising:
    a host in communication with a non-volatile memory, the nonvolatile memory containing a file system having a primary file system architecture and a discardable file system architecture; and
    a processor on the host for managing storage of one or more files in the non-volatile memory, wherein the processor is configured to:
        receive a request originating from a content publisher to store a file in the storage system, wherein the storage system deems the file discardable;
        mark the file as a discardable file, wherein to mark the file as a discardable file the processor is configured to:
            mark the file as discardable, the marking of the file being done in the file system associated with the storage system;
            cause the storage system to update the primary file system architecture to associate with the file a cluster chain that is allocated with the file, the cluster chain masking at least a physical location in the storage system associated with the file; and
            cause the storage system to update the discardable file system architecture to associate the physical location in the storage system with the file, wherein marking the file as a discardable file hides the file in the file system of the storage system such that the file is masked from a user and wherein a discardable file comprises unsolicited content that has not been requested by the user;
        determine a download condition associated with the request to store the discardable file in the storage system;
        determine whether to delay a download to the storage system of the discardable file based on the determined download condition and the marking of the file as a discardable file; and
        manage the download of the discardable file to the storage system based on the determination of whether to delay the download of the discardable file to the storage system.

17. The storage system of claim 16, wherein to manage the download of the discardable file, the processor is further configured to:
    delay the download of the discardable file to the storage system until a parameter associated with the download condition is satisfied.

18. The storage system of claim 16, wherein to determine a download condition associated with the request to store the discardable file in the storage system, the processor is further configured to:
    determine a type of network available to download the discardable file to the storage system.

19. The storage system of claim 18, wherein to determine a type of network available to download the discardable file to the storage system, the processor is further configured to:
    determine whether a wireless fidelity (WiFi) network is available to download the discardable file to the storage system.

20. The storage system of claim 18, wherein to determine a type of network available to download the discardable file to the storage system, the processor is further configured to:
    determine whether a cellular network is available to download the discardable file to the storage system.

21. The storage system of claim 16, wherein to determine a download condition associated with the request to store the discardable file in the storage system, the processor is further configured to:
    determine a power condition available to the storage system when downloading the discardable file to the storage system.

22. The storage system of claim 21, wherein to determine a power condition available to the storage system when downloading the discardable file to the storage system, the processor is further configured to:
    determine the storage device is coupled with a power supply.

23. The storage system of claim 21, wherein to determine a power condition available to the storage system when downloading the discardable file to the storage system, the processor is further configured to:
    determine that a battery associated with the storage system is charging.

24. The storage system of claim 21, wherein to determine a power condition available to the storage system when downloading the discardable file to the storage system, the processor is further configured to:
    determine a power level of a battery associated with the storage system is above a predetermined level.

25. The storage system of claim 16, wherein to determine a download condition associated the request to store the discardable file in the storage system, the processor is further configured to:
    determine a time of day associated with the request to store the discardable file in the storage system.

26. The storage system of claim 16, wherein to determine a download condition associated the request to store the discardable file in the storage system, the processor is further configured to:
  determine an amount of available storage in the storage system prior to storing the discardable file in the storage system is above a predetermined level.

27. The storage system of claim 16, wherein to mark the file as a discardable file, the processor is configured to mark the file itself to indicate that the file is a discardable file.

28. The storage system of claim 16, wherein marking the file as a discardable file comprises assigning a discarding priority level to the file.

29. The storage system of claim 16, wherein the primary file system architecture comprises a primary file allocation table ("FAT") and the discardable file system architecture comprises a discardable FAT.

30. The storage system of claim 16, wherein the processor is further configured to manage the storage of the downloaded discardable file in the non-volatile memory based on the marking of the file as a discardable file.

\* \* \* \* \*